United States Patent
Danziger et al.

(10) Patent No.: US 12,326,574 B2
(45) Date of Patent: *Jun. 10, 2025

(54) IMAGE PROJECTOR

(71) Applicant: Lumus Ltd., Ness Ziona (IL)

(72) Inventors: Yochay Danziger, Kfar Vradim (IL); Naamah Levin, Rehovot (IL); Shai Eisenberg, Ness Ziona (IL)

(73) Assignee: Lumus Ltd., Ness Ziona (IL)

( * ) Notice: Subject to any disclaimer, the term of this patent is extended or adjusted under 35 U.S.C. 154(b) by 83 days.

This patent is subject to a terminal disclaimer.

(21) Appl. No.: 18/085,580

(22) Filed: Dec. 21, 2022

(65) Prior Publication Data

US 2023/0121391 A1    Apr. 20, 2023

Related U.S. Application Data

(63) Continuation of application No. 16/770,970, filed as application No. PCT/IB2018/059815 on Dec. 10, 2018, now Pat. No. 11,561,406.
(Continued)

(51) Int. Cl.
*G02B 27/30* (2006.01)
*G02B 26/10* (2006.01)
(Continued)

(52) U.S. Cl.
CPC .......... *G02B 27/30* (2013.01); *G02B 26/101* (2013.01); *G02B 27/283* (2013.01);
(Continued)

(58) Field of Classification Search
CPC .... G02B 27/30; G02B 5/0215; G02B 26/101; G02B 27/283; G02B 26/103;
(Continued)

(56) References Cited

U.S. PATENT DOCUMENTS

| 4,383,740 A | 5/1983 | Bordovsky |
| 5,608,742 A | 3/1997 | Petersen |

(Continued)

FOREIGN PATENT DOCUMENTS

| DE | 102018102961 A1 | 8/2019 |
| JP | H2-281782 A | 11/1990 |

(Continued)

OTHER PUBLICATIONS

International Search Report and Written Opinion in corresponding International Application No. PCT/EP2020/077314 mailed on May 12, 2021, 22 pages.
(Continued)

*Primary Examiner* — Magda Cruz

(74) *Attorney, Agent, or Firm* — Rivka Friedman

(57) ABSTRACT

An image projector includes a spatial light modulator (SLM) with a two dimensional array of pixel elements controllable to modulate a property of light transmitted or reflected by the pixel elements. An illumination arrangement delivers illumination to the SLM. A collimating arrangement collimates illumination from the SLM to generate a collimated image directed to an exit stop. The illumination arrangement is configured to sequentially illuminate regions of the SLM, each corresponding to a multiple pixel elements. A controller synchronously controls the pixel elements and the illumination arrangement so as to project a collimated image with pixel intensities corresponding to a digital image.

20 Claims, 25 Drawing Sheets

Related U.S. Application Data

(60) Provisional application No. 62/687,290, filed on Jun. 20, 2018, provisional application No. 62/672,635, filed on May 17, 2018, provisional application No. 62/596,908, filed on Dec. 10, 2017.

(51) Int. Cl.
    *G02B 27/28*     (2006.01)
    *G02F 1/1362*     (2006.01)
    *G03B 21/00*     (2006.01)
    *G03B 21/20*     (2006.01)
    *H04N 9/31*     (2006.01)
    *G02B 5/02*     (2006.01)

(52) U.S. Cl.
    CPC ......... *G03B 21/006* (2013.01); *G03B 21/208* (2013.01); *H04N 9/3105* (2013.01); *H04N 9/3129* (2013.01); *H04N 9/3155* (2013.01); *G02B 5/0215* (2013.01); *G02B 26/103* (2013.01); *G02F 1/136277* (2013.01); *G02F 2203/02* (2013.01); *G02F 2203/12* (2013.01)

(58) Field of Classification Search
    CPC ............ G02B 17/0856; G02B 26/0833; G02B 27/0172; G03B 21/006; G03B 21/2073; G03B 21/208; G03B 21/005; G03B 21/20; G03B 21/2006; H04N 9/3105; H04N 9/3129; H04N 9/3155; H04N 9/31; H04N 9/3102; G02F 1/136277; G02F 2203/02; G02F 2203/12
    USPC ......................................... 348/744
    See application file for complete search history.

(56) References Cited

U.S. PATENT DOCUMENTS

| | | |
|---|---|---|
| 5,666,226 A | 9/1997 | Ezra et al. |
| 5,808,800 A | 9/1998 | Handschy et al. |
| 6,101,206 A | 8/2000 | Apollonov et al. |
| 6,104,454 A | 8/2000 | Hiyama et al. |
| 7,245,643 B2 | 7/2007 | Nakae et al. |
| 7,872,217 B2 | 1/2011 | Kasahara |
| 9,933,684 B2 | 4/2018 | Brown et al. |
| 10,177,872 B1 | 1/2019 | Wang et al. |
| 10,302,957 B2 | 5/2019 | Sissom |
| 2002/0176153 A1 | 11/2002 | Matsushita et al. |
| 2003/0137617 A1 | 7/2003 | Cornelissen et al. |
| 2004/0023422 A1 | 2/2004 | Miao et al. |
| 2004/0130681 A1 | 7/2004 | Aastuen et al. |
| 2004/0165254 A1 | 8/2004 | Tokura et al. |
| 2004/0213305 A1 | 10/2004 | Nakae et al. |
| 2006/0119951 A1* | 6/2006 | McGuire ............ G02B 27/1026 359/630 |
| 2007/0252954 A1* | 11/2007 | McGuire ................ G03B 33/12 353/20 |
| 2008/0019010 A1 | 1/2008 | Govorkov et al. |
| 2008/0101429 A1 | 5/2008 | Sipes |
| 2008/0259429 A1* | 10/2008 | Kamm .................. H04N 9/3164 359/215.1 |
| 2010/0080000 A1 | 4/2010 | Inoue et al. |
| 2010/0110368 A1 | 5/2010 | Chaum |
| 2011/0050595 A1 | 3/2011 | Lundback et al. |
| 2012/0039072 A1 | 2/2012 | Lell et al. |
| 2013/0016292 A1 | 1/2013 | Miao et al. |
| 2013/0128133 A1* | 5/2013 | Chen .................... H04N 9/3161 349/9 |
| 2013/0187836 A1 | 7/2013 | Cheng et al. |
| 2013/0272329 A1 | 10/2013 | Auen et al. |
| 2017/0132757 A1 | 5/2017 | Thiebaud et al. |
| 2018/0097335 A1 | 4/2018 | Breidenassel et al. |
| 2018/0267295 A1* | 9/2018 | Dalrymple ........... G02B 26/103 |
| 2018/0341223 A1 | 11/2018 | Shestak et al. |
| 2019/0121137 A1 | 4/2019 | Dykaar |
| 2020/0343686 A1 | 10/2020 | Jander |
| 2022/0149586 A1 | 5/2022 | Chen et al. |

FOREIGN PATENT DOCUMENTS

| | | |
|---|---|---|
| JP | H5-5817 A | 1/1993 |
| JP | H10-511228 A | 10/1998 |
| JP | 2000501574 A | 2/2000 |
| JP | 2000113486 A | 4/2000 |
| JP | 20046439 A | 1/2004 |
| JP | 2004066543 A | 3/2004 |
| JP | 2005200492 A | 7/2005 |
| JP | 2005258606 A | 9/2005 |
| JP | 2010103487 A | 5/2010 |
| JP | 2017135605 A | 8/2017 |
| JP | 2018098325 A | 6/2018 |
| JP | 2018516452 A | 6/2018 |
| JP | 2019160624 | 9/2019 |
| KR | 10-2010-0103697 A | 9/2010 |
| WO | 1998/015041 A1 | 4/1998 |
| WO | 2009091610 A9 | 7/2009 |
| WO | 2016/166323 A1 | 10/2016 |
| WO | 2019061371 A1 | 4/2019 |
| WO | 2019149352 A1 | 8/2019 |

OTHER PUBLICATIONS

English translation of the Korean Office dated Aug. 1, 2023, 6 pages.

* cited by examiner

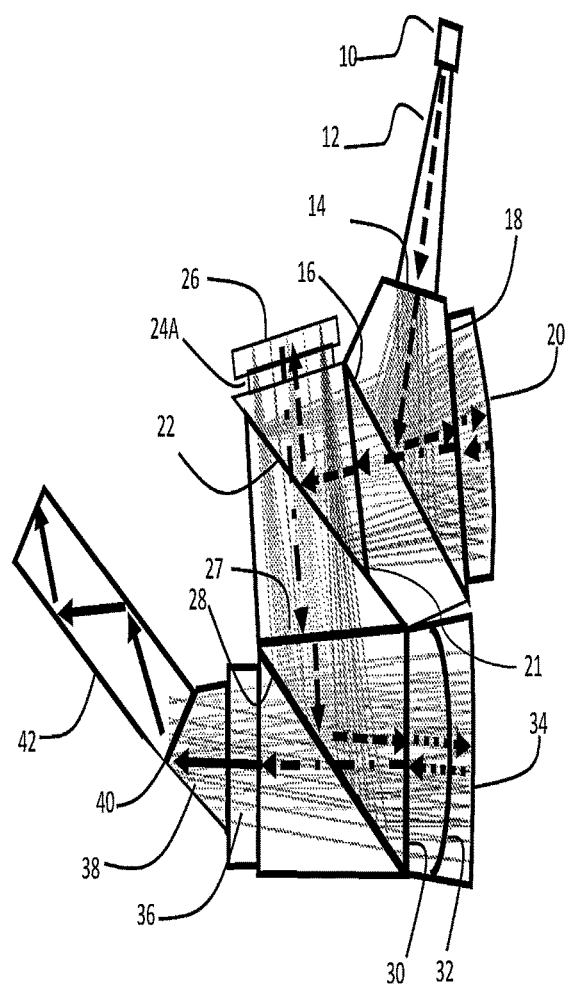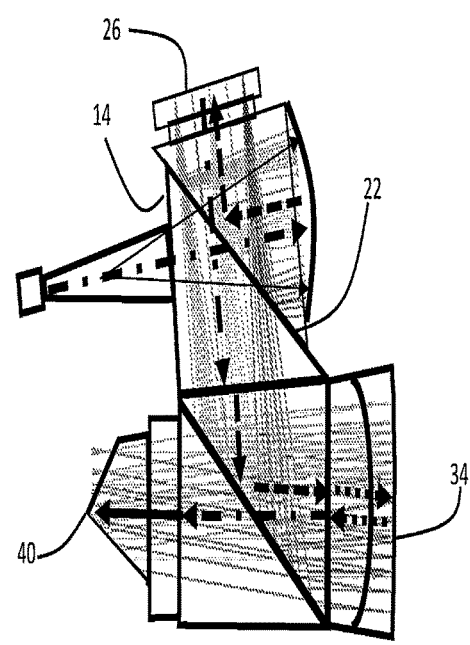
Figure2A
Figure2B

IMAGE PROJECTOR

FIELD AND BACKGROUND OF THE INVENTION

The present invention relates to image projectors and, in particular, it concerns image projectors with various configurations for illuminating a spatial light modulator.

It is known to project an image by illuminating a spatial light modulator, such as a liquid crystal display (LCD) or liquid crystal on silicon (LCOS) modulator, and collimating the modulated image for output to an eye of a user. Such projectors are often used in near eye displays, where the projected image is typically introduced into a light guide along which the image propagates by internal reflection until being coupled out to the eye of the user, typically by partially-reflective surfaces or by diffractive elements, which may contribute to expansion of the effective optical aperture from which the image is projected towards the eye.

SUMMARY OF THE INVENTION

The present invention is an image projector.

According to the teachings of an embodiment of the present invention there is provided, an image projector for projecting a collimated image via an exit stop, the collimated image being a representation of a digital image, the image projector comprising: (a) a spatial light modulator providing a two dimensional array of pixel elements, each of the pixel elements being controllable to modulate a property of light transmitted or reflected by the pixel element; (b) an illumination arrangement delivering illumination to the spatial light modulator; (c) a controller in electronic connection with the spatial light modulator and the illumination arrangement; and (d) a collimating arrangement of at least one optical element configured to collimate illumination from the spatial light modulator to generate a collimated image directed to the exit stop, wherein the illumination arrangement is configured to sequentially illuminate a plurality of regions of the spatial light modulator, each region containing a plurality of the pixel elements, and wherein the controller is configured to synchronously control the pixel elements and the illumination arrangement so as to project a collimated image with pixel intensities corresponding to the digital image.

According to a further feature of an embodiment of the present invention, the illumination arrangement includes a scanning arrangement deployed to scan a beam of illumination across the two-dimensional array of the spatial light modulator.

According to a further feature of an embodiment of the present invention, the beam of illumination spans one dimension of the two-dimension array, and wherein the scanning arrangement scans the beam of illumination in a one-dimensional scanning pattern.

According to a further feature of an embodiment of the present invention, the controller updates pixel elements of the two-dimensional array in a sequence of rows sweeping across the two-dimensional array, and wherein the scanning arrangement is synchronized to follow behind the sequence of rows, illuminating part of an updated image before completion of the update across the two-dimensional array.

According to a further feature of an embodiment of the present invention, the illumination arrangement is configured to generate at least two simultaneous beams of at least two different colors in different angular positions, and wherein the controller updates pixel elements of the two-dimensional array between passing of a first of the beams and a second of the beams.

According to a further feature of an embodiment of the present invention, the scanning arrangement scans the beam of illumination in a two-dimensional scanning pattern.

According to a further feature of an embodiment of the present invention, the scanning arrangement includes a tip of an optic fiber and an actuator deployed for displacing the tip of the optic fiber.

According to a further feature of an embodiment of the present invention, the illumination arrangement includes a plurality of independently switchable illumination sources for illuminating the plurality of regions.

According to a further feature of an embodiment of the present invention, the controller is configured to: (a) determine a maximum required intensity of a pixel of the digital image in a part of the digital image corresponding to each of the regions of the two-dimensional array; (b) determine a reduced illumination level for at least one of the regions sufficient to generate the corresponding maximum required intensity within the regions; (c) generate a modified pixel intensity map for pixels within the at least one region for generating a required projected image intensity based on the reduced illumination level; and (d) actuate the illumination arrangement to illuminate at least one region with the reduced illumination level while the pixel elements within the at least one region are actuated according to the modified pixel intensity map.

According to a further feature of an embodiment of the present invention, the illumination arrangement delivers the illumination from an illumination stop, the image projector further comprising illumination optics deployed in an optical path between the illumination stop and the spatial light modulator, wherein the illumination optics and the collimating arrangement are configured such that an image of the illumination stop falls substantially on the exit stop.

There is also provided according to the teachings of an embodiment of the present invention, an image projector for projecting a collimated image via an exit stop, the image projector comprising: (a) a spatial light modulator providing a two dimensional array of pixel elements, each of the pixel elements being controllable to modulate a polarization of light transmitted or reflected by the pixel element; (b) an illumination arrangement delivering illumination from an illumination stop; (c) illumination optics deployed in an optical path between the illumination stop and the spatial light modulator; and (d) a collimating arrangement of at least one optical element configured to collimate illumination from the spatial light modulator to generate a collimated image directed to the exit stop, wherein the illumination optics and the collimating arrangement are configured such that an image of the illumination stop falls substantially on the exit stop.

According to a further feature of an embodiment of the present invention, the illumination optics and the collimating arrangement are implemented using reflective optical components, and wherein an optical path from the illumination optics to the exit stop is implemented without an air gap.

According to a further feature of an embodiment of the present invention, the illumination optics has an optical axis, and wherein light from the illumination arrangement reaches the illumination optics at an offset angle to the optical axis.

According to a further feature of an embodiment of the present invention, illumination passing from the spatial light modulator to the collimating arrangement passes through a first polarized beam splitter and is reflected at a second polarized beam splitter, an orientation of the second polarized beam splitter being such that illumination which is P-polarized relative to the first polarized beam splitter is S-polarized relative to the second polarized beam splitter.

According to a further feature of an embodiment of the present invention, illumination passing from the illumination optics to the spatial light modulator passes through a first polarized beam splitter and is reflected at a second polarized beam splitter, an orientation of the second polarized beam splitter being such that illumination which is P-polarized relative to the first polarized beam splitter is S-polarized relative to the second polarized beam splitter.

According to a further feature of an embodiment of the present invention, the illumination optics and the collimating arrangement are implemented using reflective optical components, and wherein an optical path from the illumination stop to the exit stop is implemented without an inter-component air gap.

According to a further feature of an embodiment of the present invention, there is also provided a diffuser deployed at the illumination stop.

According to a further feature of an embodiment of the present invention, the diffuser has a substantially linear intensity distribution. According to an alternative feature of an embodiment of the present invention, the diffuser has a rectangular intensity distribution.

According to a further feature of an embodiment of the present invention, there is also provided a scanning arrangement deployed to generate a beam of illumination scanning a range of angles at the illumination stop.

According to a further feature of an embodiment of the present invention, the spatial light modulator is a reflective spatial light modulator, and wherein illumination is directed towards the spatial light modulator by internal reflection at a surface parallel to a plane of the spatial light modulator followed by reflection at a beam splitter oriented at an angle of substantially 30 degrees to the plane of the spatial light modulator.

According to a further feature of an embodiment of the present invention, there is also provided a light guide formed as a block of transparent material having at least one pair of parallel faces for supporting propagation of a projected image by internal reflection, wherein the exit stop is an entrance to the light guide.

BRIEF DESCRIPTION OF THE DRAWINGS

The invention is herein described, by way of example only, with reference to the accompanying drawings, wherein:

FIG. 2A is a side view of a first implementation of an image projector, constructed and operative according to the principles of FIG. 1;

FIG. 2B is a side view of a variant implementation of the image projector of FIG. 2A;

DESCRIPTION OF THE PREFERRED EMBODIMENTS

The present invention is an image projector.

The principles and operation of image projectors according to the present invention may be better understood with reference to the drawings and the accompanying description.

By way of introduction, the present invention relates to image projectors with various arrangements for illuminating a spatial light modulator. The subject matter described herein can be conceptually subdivided into two main aspects of the invention which each stands alone in its own right, but which are most preferably used to advantage in combination. A first aspect of the invention relates to illumination configurations in which an exit stop from which the output image is projected corresponds substantially to an image of an illumination stop from which the illumination is provided. A second aspect of the invention relates to illumination configurations which sequentially illuminate a plurality of multi-pixel regions of the spatial light modulator. Details of these two aspects, and various embodiments combining these two aspects, will be discussed below.

Figure 1:
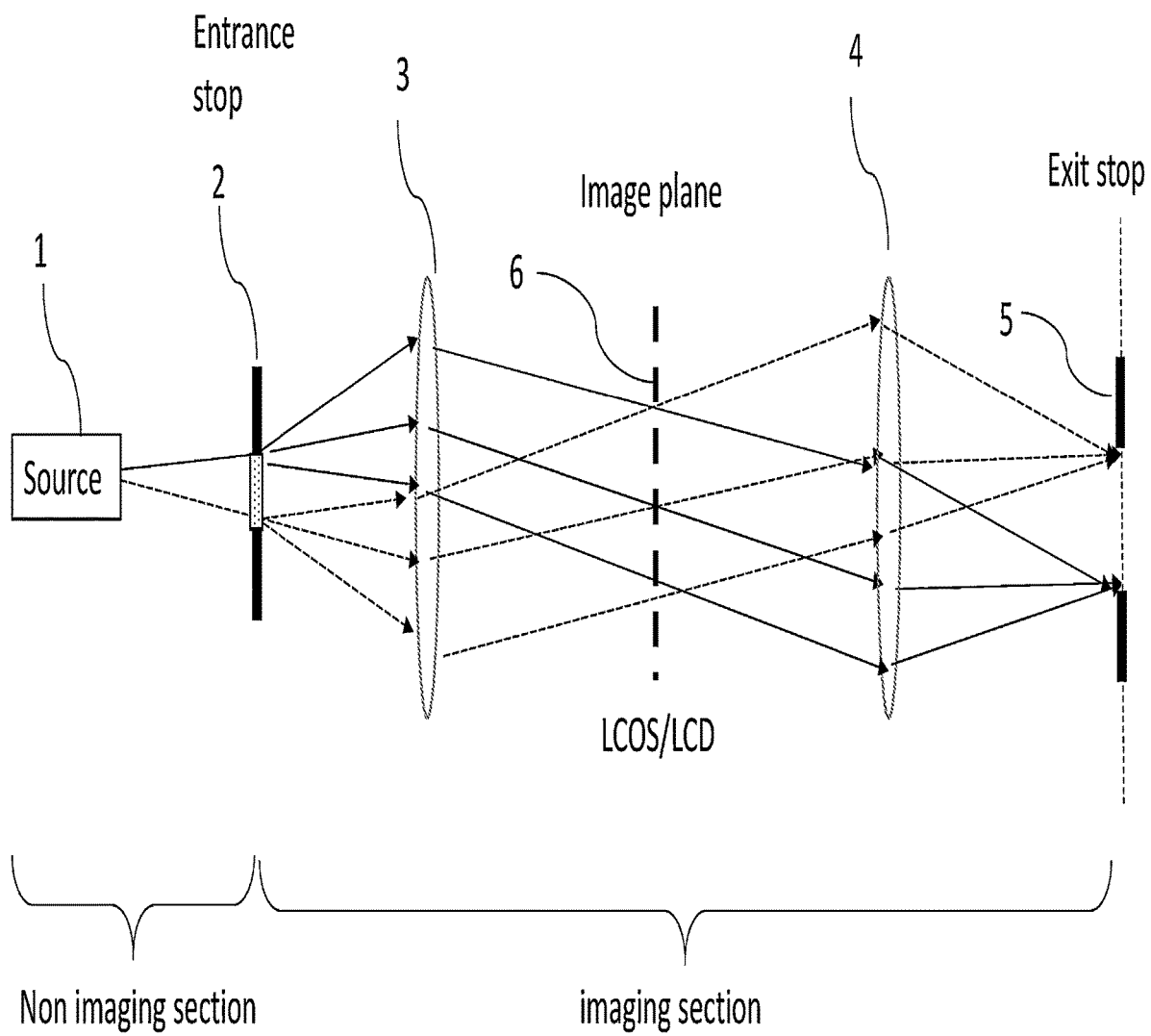
FIG. 1 is a schematic representation of an image projector, constructed and operative according to the teachings of an embodiment of the present invention.

Referring now to the drawings, FIG. 1 illustrates schematically an image projector according to a first aspect of the present invention, for projecting a collimated image via an exit stop 5. The image is generated by a spatial light modulator (SLM) 6 providing a two dimensional array of pixel elements, each of the pixel elements being controllable to modulate a property, typically polarization, of light transmitted or reflected by the pixel element. An example of a transmitted light SLM is a liquid crystal display (LCD), while an example of a reflective SLM is a liquid crystal on silicon (LCOS) device. The schematic representation here illustrates progression along an optical path from left to right, but it will be appreciated that this optical path can be folded at various reflective elements, including at LCOS 6, as will be exemplified in examples below. A collimating arrangement 4 of at least one optical element is configured to collimate illumination from the spatial light modulator to generate a collimated image directed to exit stop 5.

The image projector also includes an illumination arrangement delivering illumination from an illumination stop 2, and illumination optics 3 deployed in the optical path between illumination stop 2 and spatial light modulator 6. It is a particular feature of a first aspect of the present invention that the illumination optics 3 and the collimating arrangement 4 are configured such that an image of illumination stop 2 falls substantially on exit stop 5. This achieves "pupil imaging", ensuring that illumination rays directed from illumination stop 2 towards the SLM are efficiently directed towards the exit stop 5.

Light can be delivered to entrance stop 2 from any suitable light source 1, and can be concentrated by any suitable components, whether optical imaging components (lenses, mirrors) or non-imaging (light-pipe, diffusers) components. After illumination stop 2, only imaging optical components are used, so that "pupil-imaging" is achieved. Exit stop 5 is preferably the entrance into a light guide that relays the light-image to the observer (not shown). In a case of perfect pupil imaging, any light ray passing through stop 2 and falling on illumination optics 3 will reach exit stop 5 (subject to image modulation) and enter the waveguide, thereby achieving maximal illumination efficiency. Practically, much of the advantage of this aspect of the invention can be achieved by having the image of the illumination stop falling "substantially" on exit stop 5, taken here to mean that at least half of the rays exiting illumination stop 2 and reaching illumination optics 3, and more preferably at least 80 percent, fall on exit stop 5.

The image passing through exit stop 5 to a light guide must be collimated, i.e., where every point in the image is represented by a set of parallel rays that fill stop 5 uniformly. This can be achieved using three main alternatives:

1. Scanning: The source 1 is a point source and the image is generated by using a scanning mirror at stop 2. In this case, no modulator is required at 6.
2. Spatial modulation: A spatial light modulator 6 is placed at the focal plane of collimating arrangement 4. The modulator can be, for example, an LCOS or an LCD.
3. Combination: scanning at stop 2 with spatial modulation at plane 6 as described below according to the second aspect of the present invention.

Turning now to FIG. 2A, although the present invention may be implemented using refractive optical components and free-space optics, it is considered preferable in many cases to employ implementations without an air gap in the optical path between the illumination optics and the exit stop, and most preferably, from the illumination stop to the exit stop. Elements with optical power are preferably implemented as reflective lenses. In certain implementations described below, the optical path may include certain components, such as laser light sources and scanning mirror components, which inherently include some internal air space. Even here, however, the components are preferably encapsulated components which can be integrated with the rest of the optical system without any "inter-component air gaps", i.e., where there are no air gaps other than internal spaces within encapsulated components. The use of an architecture without inter-component air gaps helps to ensure minimal performance degradation over time due to environmental changes or penetration of dirt into the system.

In FIG. 2A, a light source 10 (equivalent to 1) can be a white LED, an array of color LEDs or a laser (color combined laser arrangement such as SLM-RGB-T20-F-2 commercially available from Sumitomo Electric, Japan). The light propagates through a light-pipe 12 that concentrates and homogenizes the light distribution. This concentrator can be any other imaging (lenses) or non-imaging (light-pipe, micro-lens-array) component or components that serve to condense and homogenize the light distribution on plane 14.

Plane 14 (equivalent to illumination stop 2) is the last plane where non-imaging component can be used. It can include a diffuser that spreads the angular distribution of the light rays to illuminate the image modulator 26 (equivalent to SLM 6). This plane 14 is also an image of exit pupil plane 40 (equivalent to exit stop 5), such that an aperture (stop) can be placed here to prevent light outside the image of 40 from entering the system. The excess light (outside the image) will not enter the waveguide and degrade image quality.

In following figures, the S-polarization is shown as dashed arrows, P-polarization as dot-dashed arrows, circular polarization as dotted arrows and unpolarized as solid arrows. In order to obtain a single polarization, certain particularly preferred implementations include a polarizer at plane 14 that transmits S-polarization.

From surface 14, the S-polarized light propagates to surface 16 that is a polarizing beam splitter (PBS). The PBS can be a wire grid or dielectric that reflects the S polarization but transmits the P polarization.

The s-polarized light passes through surface 18 that is a quarter wave plate ("lambda/4 wave plate") that convert the S-polarization to circular. After reflection by a reflecting lens 20 (equivalent to illumination optics 3), on a second pass through the quarter wave plate 18, the light is P-polarized and passes through PBS 16. Surface 21 is provided with a half-wave plate ("lambda/2 retarder") that convert the P-polarization to S-polarization, so as to be reflected from a second PBS 22 towards spatial light modulator 26 (equivalent to SLM 6). This image generator rotates the light polarization (of bright pixels) to P-polarization so the light passes through PBS 22. Surface 27 is provided with another half wave plate (lambda/2 retarder), resulting in S-polarization, which is reflected towards quarter wave plate 30 and reflective collimating optics 34, which is preferably implemented as two doublet lenses (separated by 32) that serve to collimate white light while compensating for aberrations. The reflected collimated light, after again traversing quarter wave plate 30, is P-polarized so as to traverse PBS 28. Depending on the requirements of the optical system to which the projected image is being supplied, the collimated image may additionally pass through a depolarizer 36, which serves to depolarize the light (by active or passive depolarizer) before passing through a coupling prism 38 and aperture 40 (equivalent to exit stop 5) into a light guide (or "waveguide") 42.

FIG. 2B shows an equivalent architecture where pupil-imaging is performed but illumination is from different orientation relative to PBS 22. In this configuration light traverses PBS 22 from two directions. This architecture tend to have a reduced polarization extinction ratio due to imperfections of the PBS. Other architectures using a two-pass PBS are also possible. However, in the following examples, architecture 2A is used as a preferred base design for clarity and improved contrast of the image.

Figure 3:
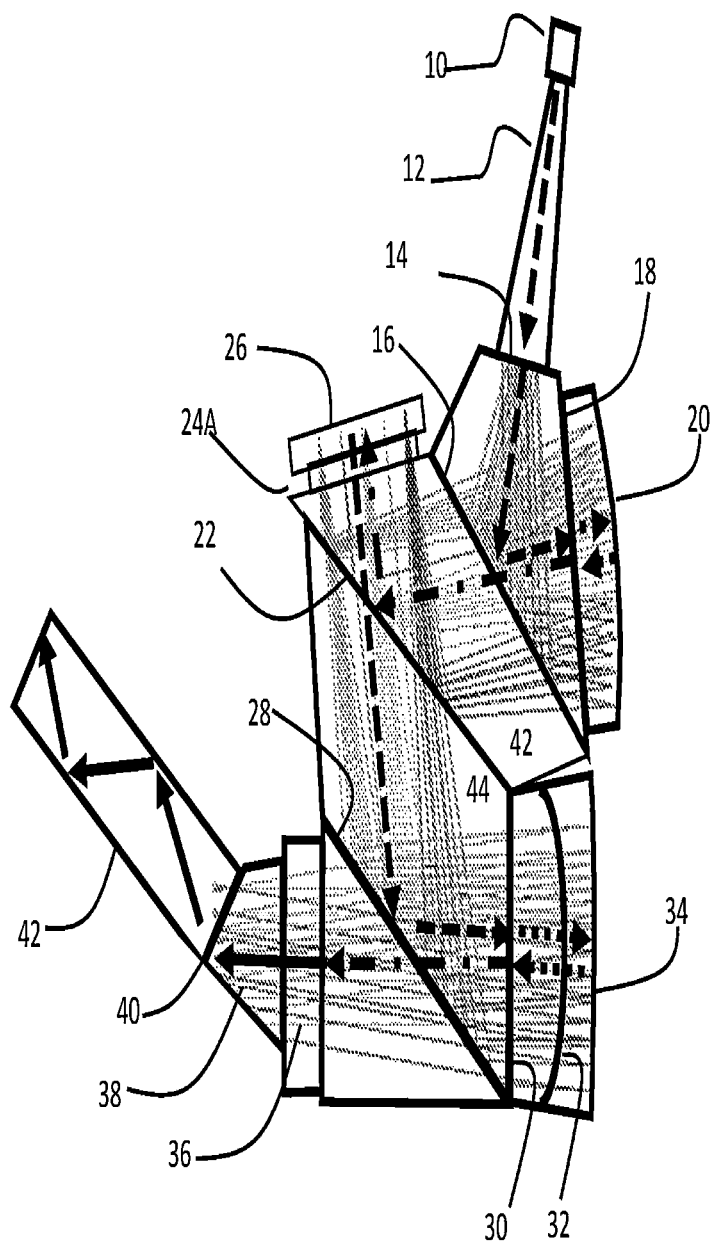
FIG. 3 is a side view of a second variant implementation of the image projector of FIG. 2A.

FIG. 3 shows architecture similar to FIG. 2, but where PBS 22 is implemented as a structural polarizer, such as a wire grid, and is rotated to reflect P-polarization. As a result, the lambda/2 retarder components 21 and 27 are omitted. This configuration has fewer components, and is therefore simpler to integrate.

Alternatively, and equivalent result can be obtained by implementing PBS 22 as a conventional PBS reflecting S-polarization while PBS's 16 and 28 are modified to reflect p-polarization.

An alternative implementation to achieve transmission through a first PBS and reflection at a second PBS, without requiring use of a half-wave retarder plate, is to employ a "twisted" architecture in which an orientation of the second PBS is such that illumination which is P-polarized relative to the first polarized beam splitter is S-polarized relative to the second polarized beam splitter. One such architecture is illustrated schematically in FIG. 4, a source 10 has an optical window 202 transmit light through a diffuser, a polarizer and an aperture 204 (equivalent to 14 and 2, above). This light is now S-polarized relative to a first PBS 206 (equivalent to 16, above), so as to be reflected towards reflecting lens 208 (equivalent to 2 and 20, above), which additionally has a quarter wave plate on its surface, so that the reflected light passes PBS 206 and reaches second PBS 210 that is at 90 degrees to the previous one (referring to rotation about the light propagation axis for the center of the image). Consequently, the light is S polarized relative to 210 PBS and is reflected toward the LCOS 212 (equivalent to 26, above, and appearing here on the closer side of the arrangement in this image orientation). The LCOS 212 reflects and rotates the polarization of bright pixels to P so that the light passes through PBS 210 to reach PBS 214 (equivalent to 28, above), which is also rotated by 90 degrees about the light propagation axis so that the image illumination is S-polarized relative to PBS 214, and is reflected towards wave plate and reflecting lenses 216 (equivalent to elements 30, 32 and 34, above). The light corresponding to the collimated image then traverses PBS 214 and passes through the exit stop 218 to enter the waveguide (equivalent to elements 36, 38, 40 and 42, above).

Figure 4:
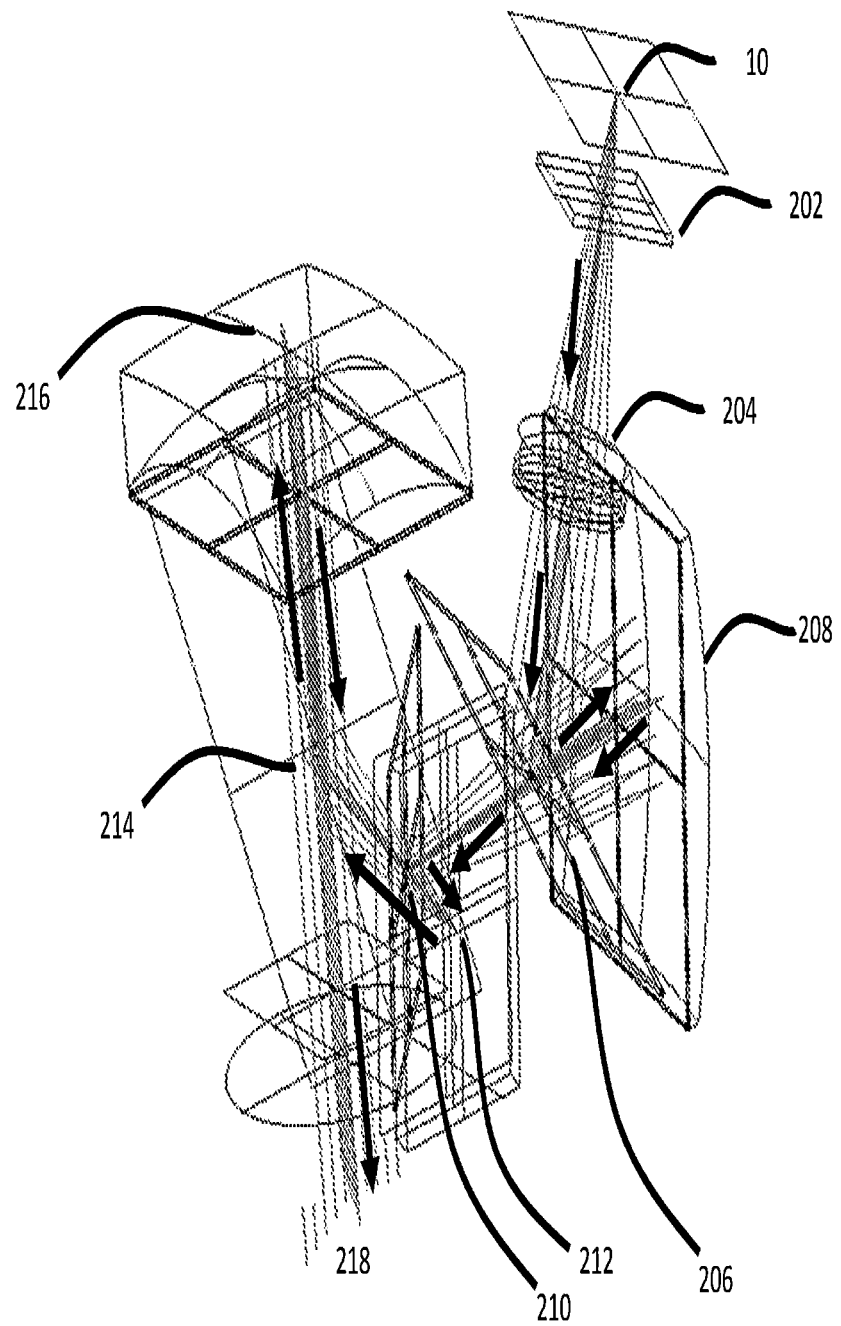
FIG. 4 is a schematic isometric view of a third variant implementation of the image projector of FIG. 2A.

It should be noted that FIG. 4 is shown with only the main optical elements and PBS's in isometric view, but omitting the bulk of the prisms which fill the spaces between the optical elements. Here too, the implementation is preferably without inter-component air gaps, but is shown with the bulk of the transparent media removed for clarity of presentation of the optical architecture.

Figure 5:
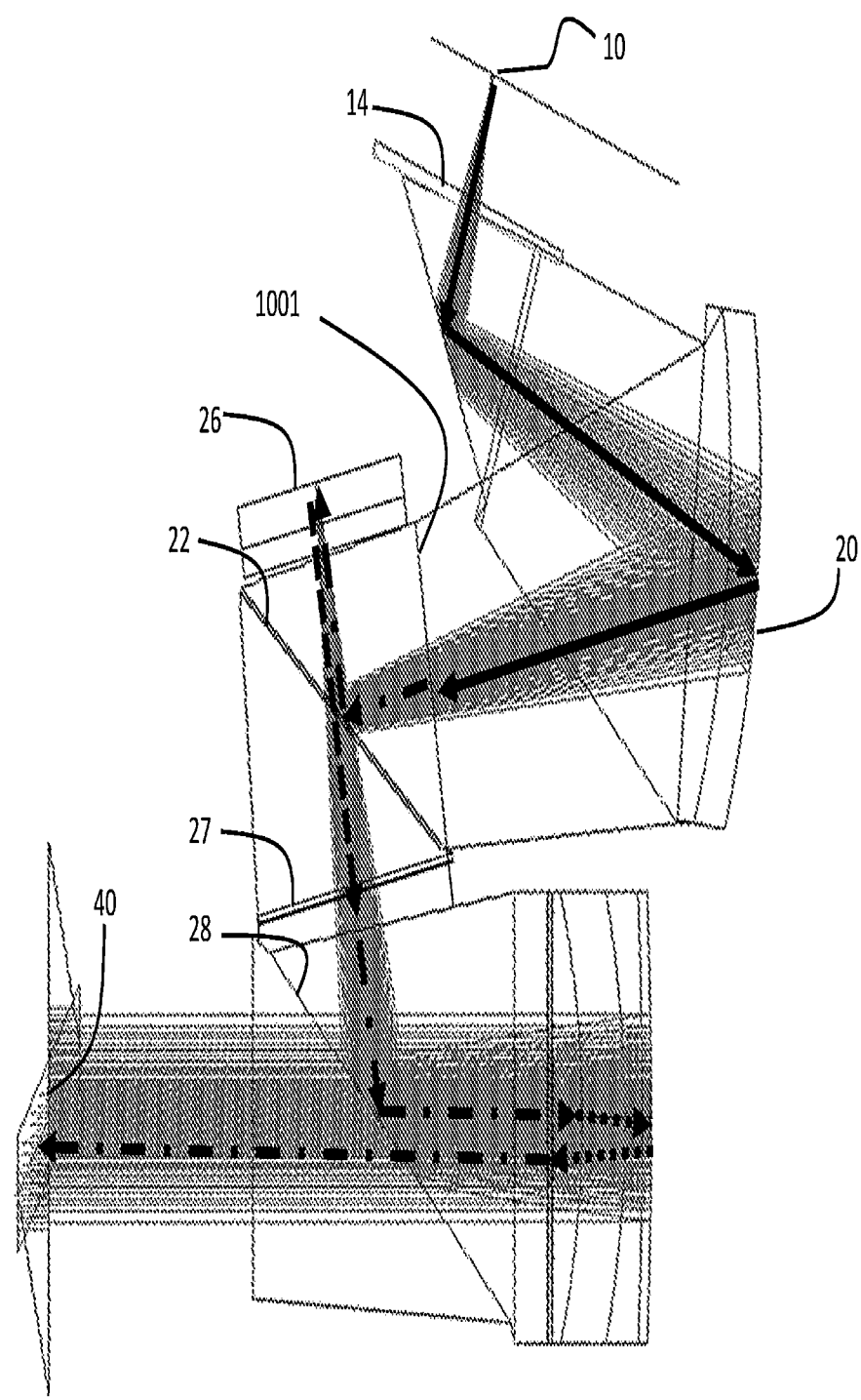
FIG. 5 is a side view of a fourth variant implementation of the image projector of FIG. 2A.

FIG. 5 illustrates another optional implementation for avoiding the need for a half-wave retarder plate in the illumination side of the optics. In this case, light from the illumination arrangement 10, 14 reaches a reflective lens 20 of the illumination optics at an offset angle to an optical axis of lens 20. As a result, the reflected illumination is offset to the opposite side of the optical axis sufficiently to allow separation of the optical paths geometrically, without use of a beam splitter. The illumination thus can be introduced as S-polarization relative to PBS 22, and need not in principle undergo any polarization modification prior to reaching PBS 22. In practice, a polarizer 1001 is preferably used just prior to PBS 22 to improve modulation contrast. In this configuration, the "pupil-imaging" achieved between illumination stop 14 and exit stop 40 is subject to some degree of aberration, but aberration on the illumination side, prior to reflection at the imaging plane of the LCOS 26, does not impact the quality of the projected image.

For simplicity of illustration, the configuration of FIG. 5 is illustrated here with a half-wavelength retarder plate 27 between PBS 22 and PBS 28. An alternative particularly preferred implementation employs a "twisted" geometry for the PBS 28 and collimating optics, where the lower part of the assembly is rotated 90 degrees about the central ray of the propagation direction, for example, at plane 27, so that PBS 28 will direct the light from the LCOS in a direction into the page of the drawing as illustrated, thereby achieving collimation of the image without requiring a half-wavelength retarder plate.

Figure 6:
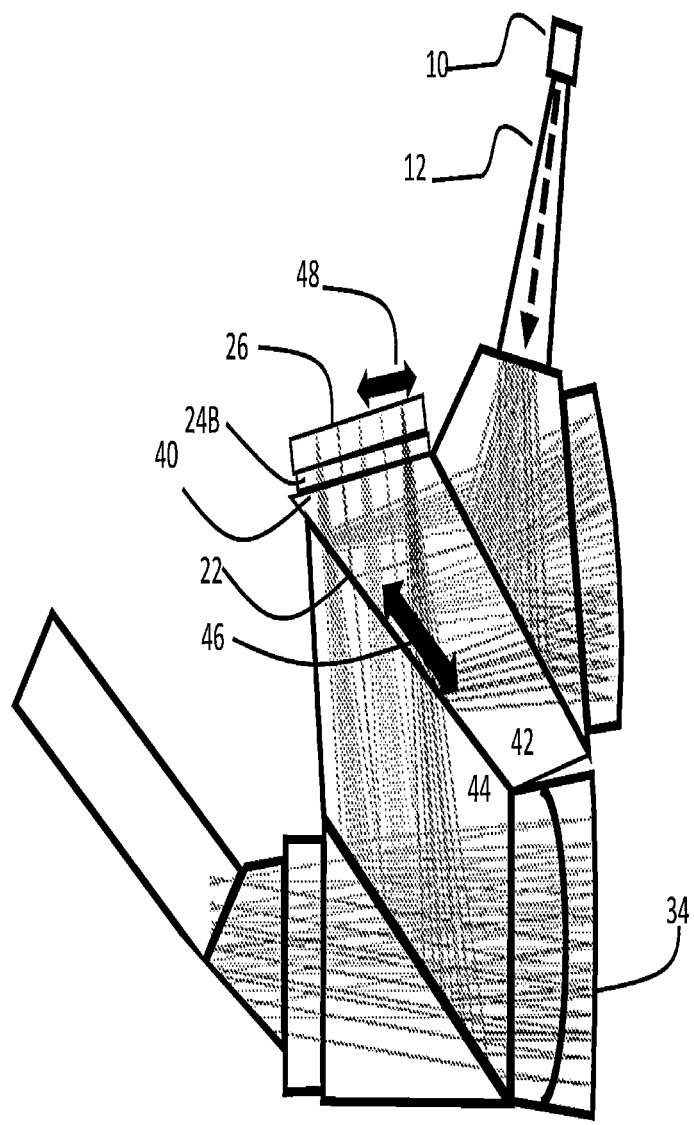
FIG. 6 is a side view similar to FIG. 3 illustrating a manner of focus adjustment during assembly of the projector without requiring an air gap between components.

FIG. 6 shows an option for achieving focus adjustment of a device according to one of the above configurations. By sliding prism 42 on top of 44 along surface 22 (as indicated by arrow 46), the distance between image modulator 26 and collimating reflective optics 34 can be adjusted continuously. Modification of the position of SLM 26 may be needed (as indicated by arrow 48). This continuous focusing enables accurate focusing while maintaining a no-air-gap configuration. As a practical assembly method, the structure is preferably assembled with a UV-curable optical adhesive interposed between the surfaces along a PBS plane. Focus is achieved during assembly by sliding one prism component relative to another prism component along the PBS plane to achieve focus of an optical arrangement, followed by treating the optical adhesive between the prisms by application of UV light to set the adhesive.

Optimal illumination requires fulfilment of two conditions:

1. Uniform spatial intensity distribution at the aperture 40 (equivalent to 5) with minimal 'spillover' of wasted illumination. This is achieved by uniformly illuminating the aperture image on plane 14 (equivalent to 2).

2. Uniformly illuminating image generator 26 with minimal 'spillover'. This is achieved by generating appropriate angular distribution at plane 14.

Figure 7:
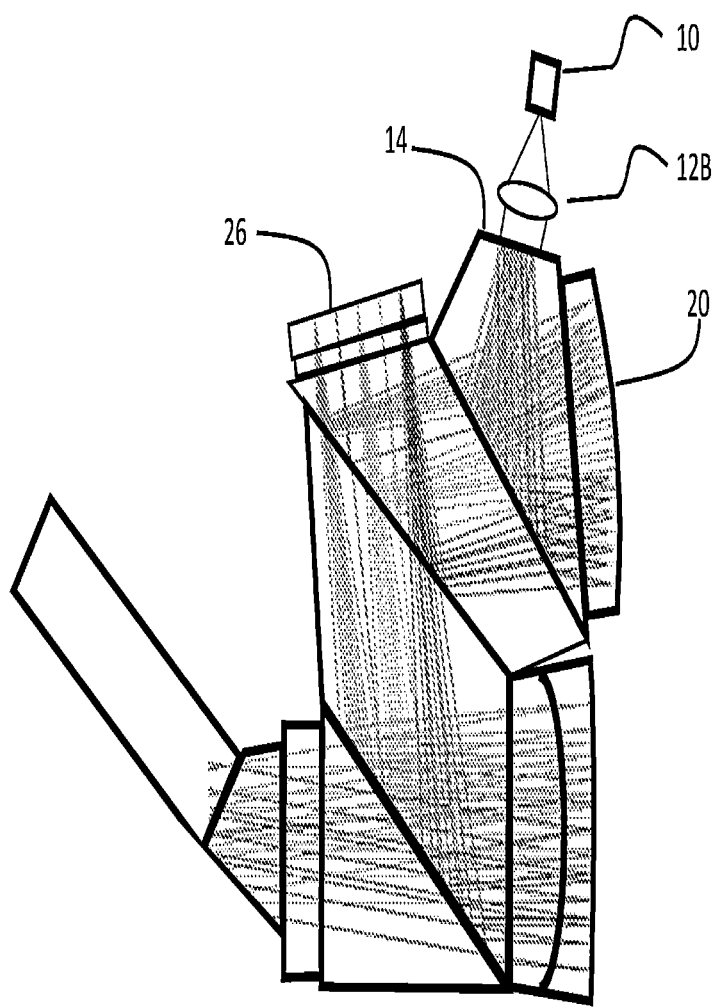
FIG. 7 is a side view of an image projector similar to FIG. 3 illustrating use of a collimated laser illumination system.

An advantageous approach for satisfying these two requirements is shown in FIG. 7. The light from source 10 is collimated by lens 12B. This collimated light passes through a structured diffuser placed at plane 14. This diffuser is designed to diffuse collimated light to a predefined angular distribution, preferably rectangular. A range of structured diffusers with different forms of angular distribution are commercially available from various sources such as the ENGINEERED DIFFUSERS™ range of diffusers available from RPC Photonics (NY, USA). Lens 20 (equivalent to 3) converts this angular distribution at illumination stop 14 to a corresponding intensity distribution on SLM 26 (also referred as Fourier transform). This rectangle distribution overlaps the active area of 26 with minimal 'spillover'.

Figure 8:
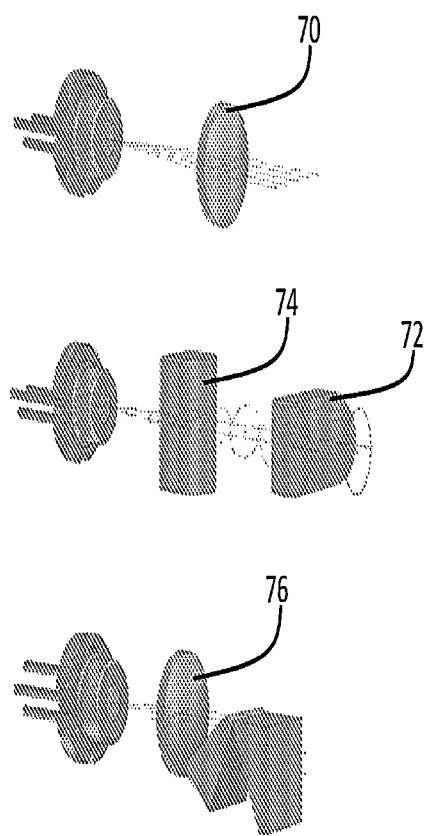
FIG. 8 illustrates a number of optical arrangements for collimating output of a laser.

Optimal collimation at lens 12B is achieved if light source 10 is a laser or narrow LED emitter (such as side emitting LED). FIG. 8 shows few configurations that can be used for collimating lasers or narrow LEDs having different divergence for two axis, for example, employing a simple spherical lens 70, a combination of cylindrical lenses 72 and 74, or various combinations of lenses and prisms 76. For high laser output, the generated beam can be hazardous to the human eye. However, after passing through a diffuser on plane 14, the risk is reduced substantially. There is a potential risk in the event of breakage of the arrangement that a collimated high brightness beam could be transmitted outward, posing an eye hazard. It is therefore preferred, according to this aspect of the present invention, to place a diffuser as part of the collimating optics itself instead of at surface 14. In FIG. 8, 70 represents a surface that is to be defused (or its opposite surface). If surface 72 is defused, the beam is collimated in one dimension between the lenses. Improved brightness reduction is achieved by placing the diffuser on the first cylindrical element 74.

If astigmatic prisms are used, it is preferable to introduce the diffuser on the lens surface 76. All configurations in FIG. 8 preferably use the diffuser on the lenses instead in surface 14. As a result, the light beam expands as it propagate onto surface 14. A distance between these elements should therefore be minimized in order to minimize energy losses.

All configurations described thus far are designed for illuminating the entire image generator 26 (SLM 6) simultaneously by the illumination source. However in certain implementations, and particularly for augmented reality displays, not all pixels are required to generate an image all the time. For this and other reasons, it may be advantageous in certain implementations to allow selective illumination of the SLM, only where required and/or only with the power level required, thereby reducing power requirements and possibly providing additional advantages, as will be described below.

Figure 9A:
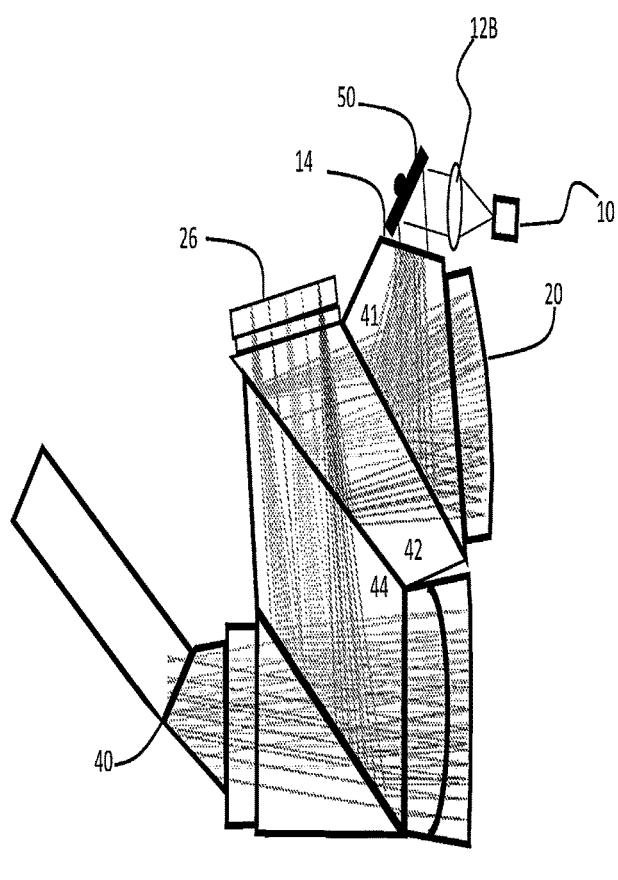
FIG. 9A is a side view of a further variant implementation of an image projector similar to FIG. 3 but employing a scanning arrangement for generating scanned illumination.

FIG. 9A shows an implementation configured to illuminate only part of image generator 26 at a time. Source 10, preferably a laser, is collimated by optics 12B onto a scanning mirror 50 or other high-speed mirror (preferably MEMS). Non-collimated may also be used, as long as image generator 26 is properly illuminated. Scanning mirror 50 is preferably located at an image plane (corresponding to illumination stop 2, above) of the exit pupil 40. (In this configuration, lens 20 will be slightly modified relative to the corresponding lens in the previous drawings in order to shift the image plane from plane 14 to the position of scanning mirror 50.) The illumination spot on SLM 26 is configured such that, in combination with the scanning motion of mirror 50, the illumination covers all of an active area of SLM 26. It is preferable that the spot size is large enough to cover a relatively large number of pixels, typically at least 10, preferably at least 100, and in some preferred cases at least 1000 pixels or in excess of 10,000 pixels (e.g., 100×100 pixels or larger), thereby reducing scanning speed requirements for mirror 50. The shape of the illuminating spot can be modified, for example, by the shape of the emitter beam from source 10, optical properties of source collimation optics 12B, deployment of a diffuser on mirror 5 and/or deployment of a diffuser on plane 14. Where diffusers are used, the diffuser is preferably a structured diffuser with a specifically chosen angular distribution of the output light, such as those mentioned above as being commercially available from RPC Photonics (NY, USA).

Figure 9B:
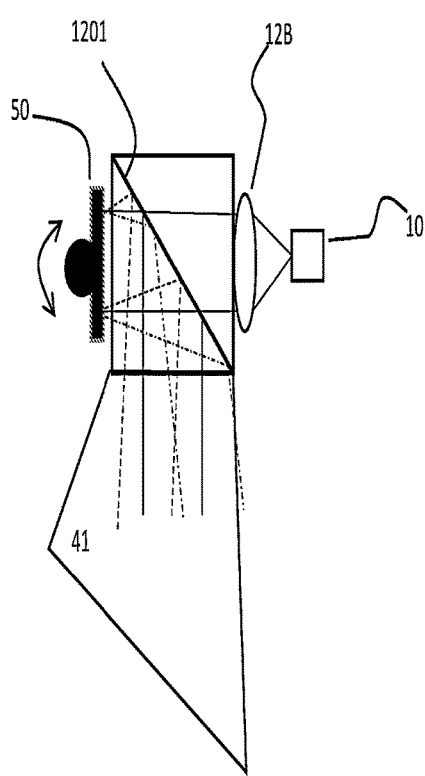
FIG. 9B is an enlarged view of an alternative scanning arrangement for the image projector of FIG. 9A.

FIG. 9B shows an alternative for positioning scanning mirror 50. Perpendicular incidence on the face of mirror 50 (that is also the image plane of 40) enable usage on small mirror with a minimal air gap, typically available as an encapsulated component so as to facilitate implementation without any inter-component air gap. In FIG. 9B, a PBS 1201 (used in combination with a quarter wave plate retarder) is used to facilitate this perpendicular incidence. In this configuration, as mentioned, the scanning mirror is preferably encapsulated by itself as a component therefore not considered as air gap. The laser and collimating optics are also preferably provided as an encapsulated component. Therefore the integrated system in 9B can be considered as air-gap free on a system level, i.e., "without inter-component air gaps".

Figure 9C:
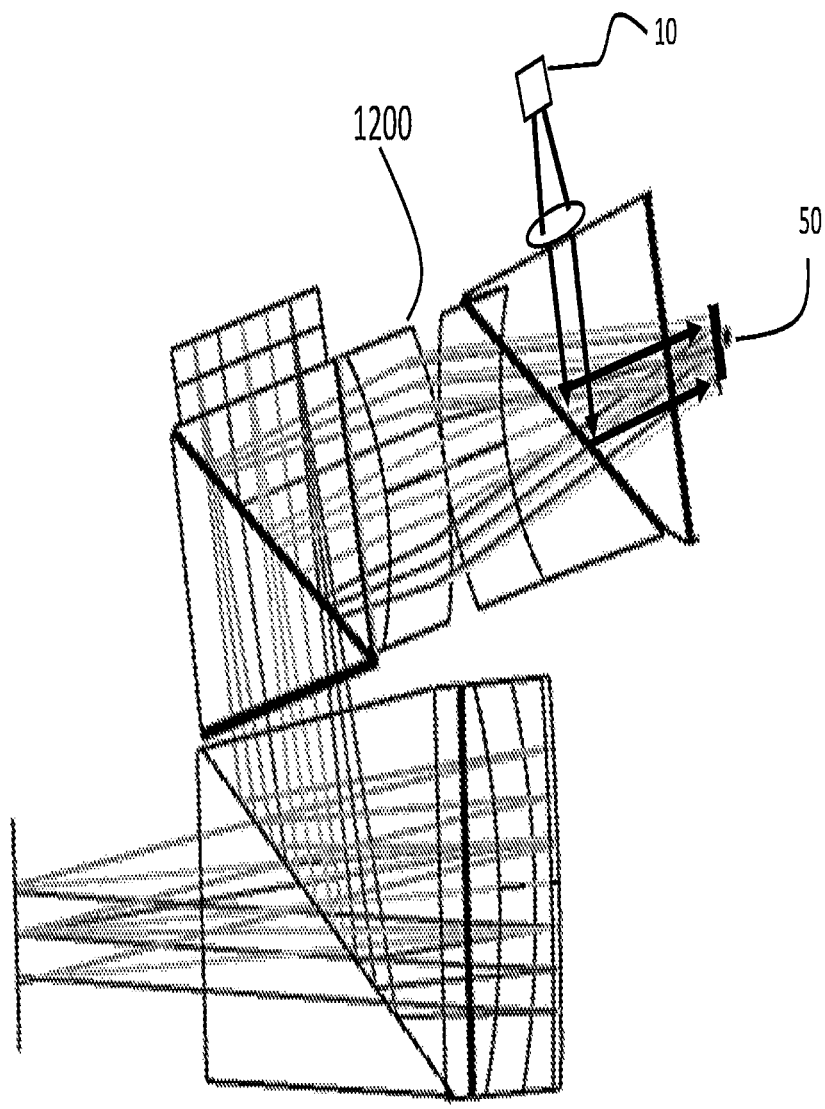
FIG. 9C is a side view of a further embodiment of an image projector, constructed and operative according to the teachings of an embodiment of the present invention, employing scanning illumination.

FIG. 9C shows another architecture where a refractive lens 1200 with an air-gap replaces reflecting surface 20 thereby also enabling perpendicular incidence onto scanning mirror 50.

Figure 10A:
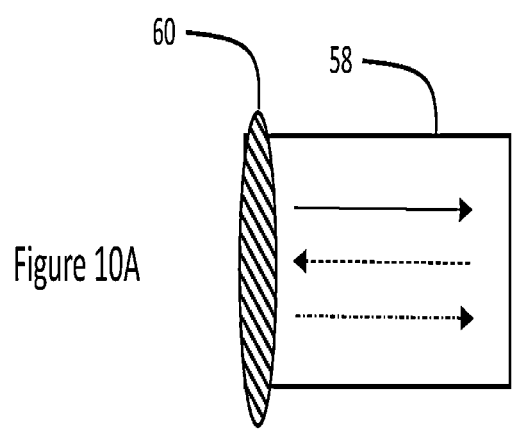
FIGS. 10A-10C are schematic illustrations of three possible scanning illumination patterns for implementing in the embodiments of FIGS. 9A-9C.
Figure 10B:
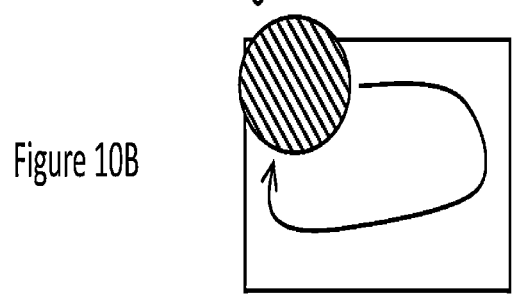
Figure 10C:
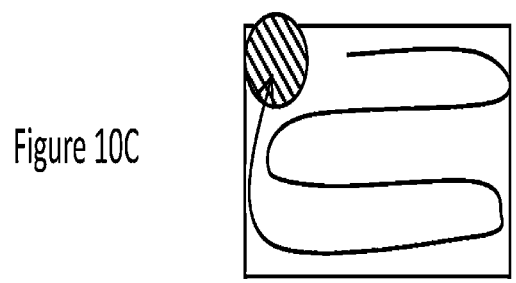

Exemplary scanning patterns of mirror 50 are shown schematically in FIGS. 10A-10C. FIG. 10A illustrates a first preferred implementation according to which a beam of illumination 60 spans one dimension of the two-dimension pixel array 58, and a scanning arrangement scans the beam of illumination in a one-dimensional scanning pattern. For this purpose, the components shaping the beam angularly at the illumination arrangement (e.g., a diffuser or the other options described above, or by use of an elongated emitter pattern, such as a line of diodes) preferably generate a substantially linear intensity distribution. "Substantially linear" in this context is used to define an intensity distribution, angular or spatial (depending on at which plane it is sampled) which has a major-to-minor axis ratio of at least 10:1. The intensity distribution thus defined includes a wide range of options such as, for example, an elongated elliptical form.

FIG. 10B illustrates a further option for a simple two-dimensional scanning pattern, where the illuminated region spans half of one of the array dimensions, allowing full coverage by a simple to-and-fro rectangular scanning motion, and FIG. 10C shows a more complicated scanning pattern. The main difference between the scanning methods is the complexity and scanning speed required from the scanner, and the associated illumination spot pattern. It should be noted that, wherever reference is made to a scanning motion, the illumination may be continuous during a sweeping scanning motion, or may be a stepped illumination pattern achieved either by a stepped motion of a mechanical scanning mechanism or by use of higher intensity short pulses of illumination triggered at a sequence of positions through a continuous mechanical scanning motion. Where a stepped scanning pattern is used, the steps may illuminate non-overlapping regions, or may illuminate overlapping regions.

Figure 11A:
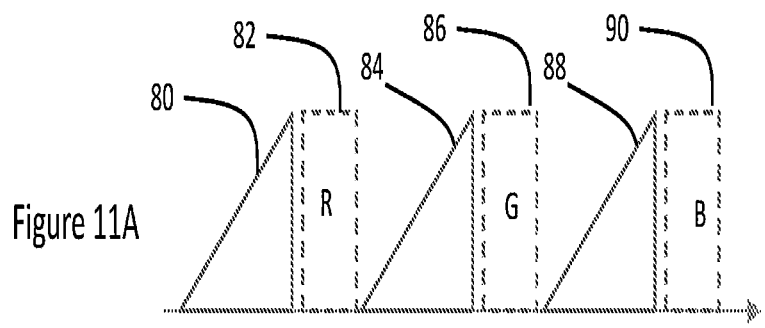
FIGS. 11A-11C are schematic representations of an image loading and illumination scanning sequence according to various implementations of the present invention.
Figure 11B:
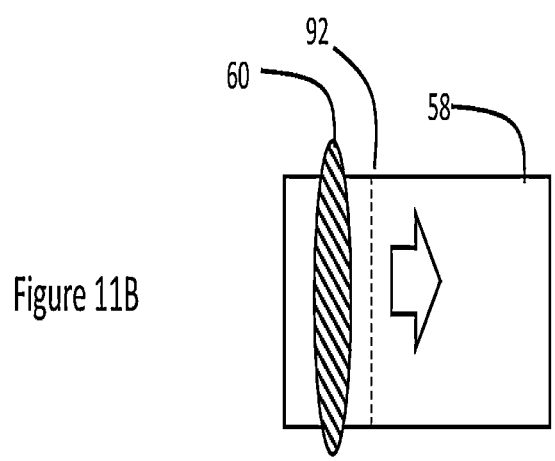
Figure 11C:
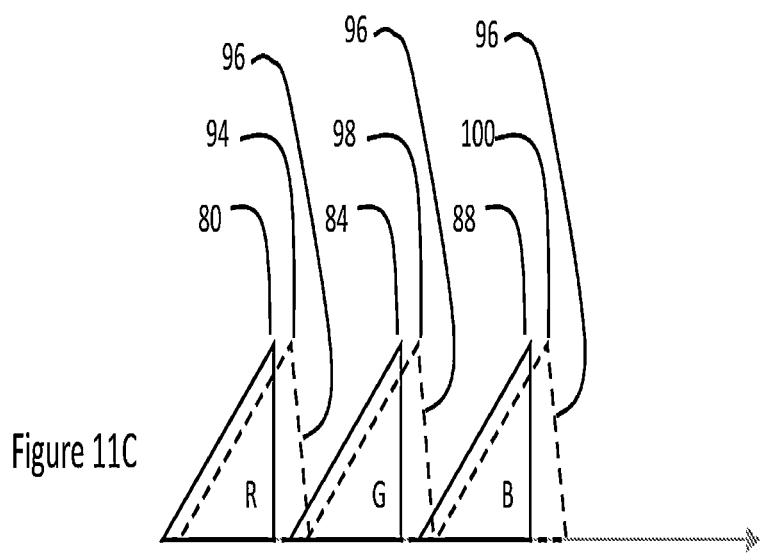

Sequential color projection requires that three images (red, green and blue) are loaded onto projector 26 and illuminated in rapid sequence. FIGS. 11A-11C illustrate various options for who this can be implemented effectively using the described structured illumination.

For many image generators, including a particularly preferred example of an LCOS image generator, a controller typically updates pixel elements of the two-dimensional array in a sequence of rows sweeping across the two-dimensional array, thereby loading an image pattern using a "rolling shutter" pattern where rows or columns (used interchangeably) of pixel data are loaded sequentially. In a color sequential system, this dictates that the illumination will be activated only after an entire image of each color separation was loaded. This dictates a waiting period, without illumination, during loading of each color separation, three times per frame image, and therefore limits the illumination time and the frame rate.

FIG. 11A shows the sequence of LCOS image loading and illumination in existing systems. The X axis is time and Y is arbitrary units. The loading time slot 80 represent in triangular form the number of rows of the LCOS matrix as they load the red image. Time slot 82 is the illumination by the red light source. Time slots 84 and 86 are corresponding LCOS image loading time and exposure for the green color separation, and 88 and 90 are for blue.

FIG. 11B shows the image plane of the SLM. The controller loads an image to the pixels of the LCOS matrix 58 (plane 26) in a sequence of rows sweeping across the two-dimensional array, as represented by line 92 moving to the right (represented by an arrow). According to an aspect of an embodiment of the present invention, the controller also operates the scanning arrangement synchronously so that illumination pattern 60 follows behind the sequence of rows, illuminating part of an updated image before completion of the update across the two-dimensional array.

FIG. 11C shows a time sequence of the illumination shown in FIG. 11B. Loading of the red image, represented by triangle 80, is immediately followed by a scan of mirror 50 shown as plot 94, such that illumination starts before the full image loading is complete. At time slot 96 the mirror 50 back-scans rapidly to the beginning of scan. Same sequence repeats for green (84, 98, 96) and for blue (88, 100, 96).

In this configuration, the illumination is almost continuous, thereby reducing requirements for high instantaneous intensity light sources, and the frame rate can be higher than can be achieved by the illuminate-between-image-loading scheme of FIG. 11A.

Figure 12A:
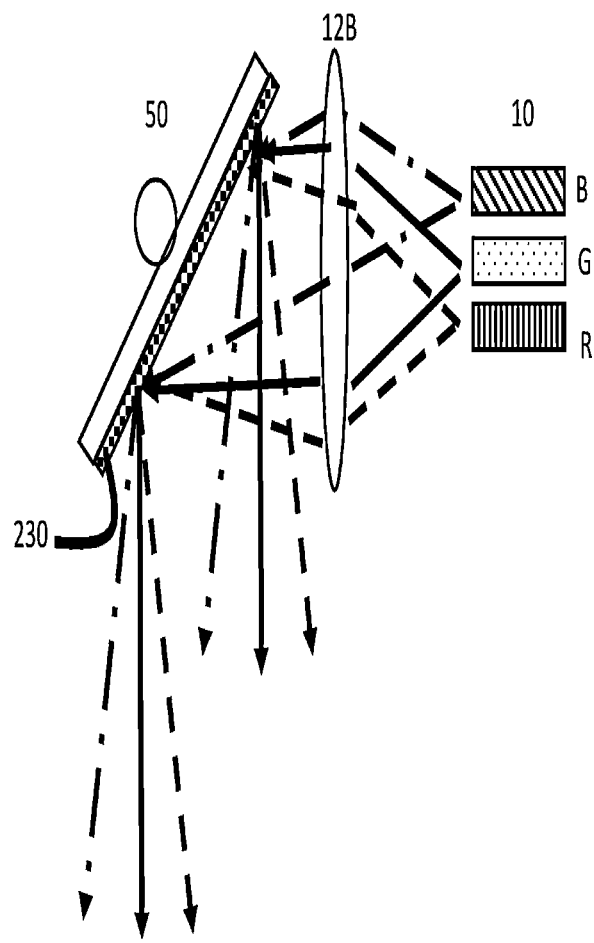
FIG. 12A is a schematic side view of a multi-color laser scanning arrangement for simultaneous scanning with an illumination pattern of more than one color.
Figure 12B:
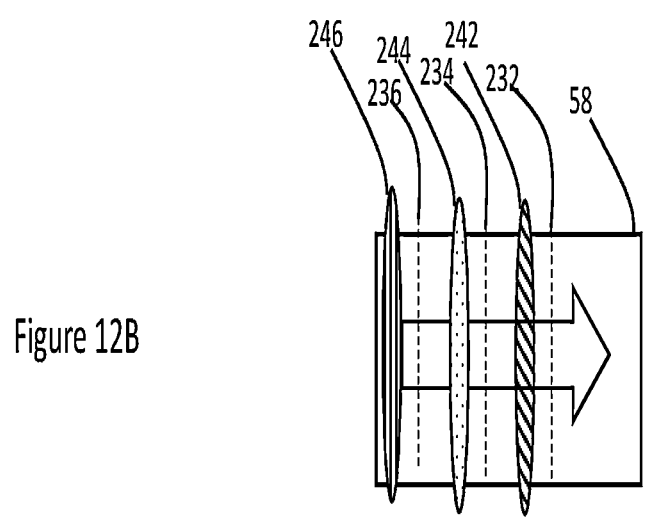
FIG. 12B is a schematic representation of an image loading and illumination scanning sequence employing the multi-color laser scanning arrangement of FIG. 12A.

Sequential projection of color images may in some cases introduce "color break-up" in which the image is perceived as if the red, green and blue images do not overlap. This issue can be ameliorated by projecting almost simultaneously the red, green and blue images according to a further optional aspect of the present invention as illustrated here with reference to FIGS. 12A-12B. FIG. 12A shows an enlarged schematic representation of a laser 10 and scanner 50. The R, G and B lasers 10 are collimated by optics 12B. Other collimating arrangement are also possible such as micro-lenses and diffractive elements. For example, if all colors are emerging from a single point then a dispersive or diffractive element is used to divert the different colors to the different directions. All three colors are collimated in slightly different angles while the scanning mirror 50 diverts all three laser beams direction simultaneously. As previously described, a diffuser (line diffuser in case of 1D scanner) is located outside the scanner (e.g., at plane 14) or on the reflecting surface 230 of scanner 50. This optical arrangement will generate three separate illumination patterns on the LCOS 26. In the case of a line diffuser, three separate lines are generated. The lines image should be approximately perpendicular to the scanning direction of the scanner 50 as shown in FIG. 12B.

This configuration allows simultaneous illumination of different parts of the two-dimensional pixel array with different colors, while the controller updates pixel elements of the two dimensional array between passing of the beams for successive colors. FIG. 12B shows the image plane 26. The blue image is loaded onto the LCOS as rolling shutter 232 where loading is from left to right much like described in FIG. 11B. Simultaneously and behind it, the green image is loaded as rolling shutter 234 and behind it the red image as 236. Therefore, all three color images are loaded onto the LCOS with minimal delay. The illuminating scanner synchronize with the rolling shutter process and illuminate the LCOS in-between the rolling shutter lines. The blue line 242 is between 232 and 234, the green line is between 234 and 236 and the red line is behind 236. The range of mechanical motion of the scanning arrangement 50 should be sufficient to allow each of the beams to traverse the entirety of the pixel array. Clearly, each color beam need only be actuated for the part of the scanning motion for which it falls on the area of the pixel array.

In this configuration, a single frame scan will project all colors with minimal delay between color images projection and therefore minimal color breakup.

Suitable light sources for generating simultaneous beams of three colors are commercially available from various providers, such as the full color laser modules marketed under the name RGB-ONE™ by Sumitomo Electric (JP).

As mentioned above, sequential illumination of different regions of the two-dimensional pixel array allows savings in illumination power in various ways. Firstly, in regions where no image content is required, the illumination source need not be actuated, thereby saving significant power. An example of such an application is an augmented reality application where much of the display area is left inactive, to allow an undisturbed review of the real world, and only selected regions of the display are actuated to provide the augmented reality content.

In other situations, even where a region of the display is active, it may still be possible to save display power in accordance with a local maximum required display intensity. Specifically, according to a further aspect of certain implementations of the present invention, the display controller is configured to: (a) determine a maximum required intensity of a pixel of the digital image in a part of the digital image corresponding to each of the regions of the two-dimensional array; (b) determine a reduced illumination level for at least one of the regions sufficient to generate the corresponding maximum required intensity within the regions; (c) generate a modified pixel intensity map for pixels within the at least one region for generating a required projected image intensity based on the reduced illumination level; and (d) actuate the illumination arrangement to illuminate at least one region with the reduced illumination level while the pixel elements within the at least one region are actuated according to the modified pixel intensity map.

This feature is illustrated here with reference to a line-scanning scan pattern of the sort described above with reference to FIG. 12, but can equally be implemented for other illumination patterns.

Figure 13:
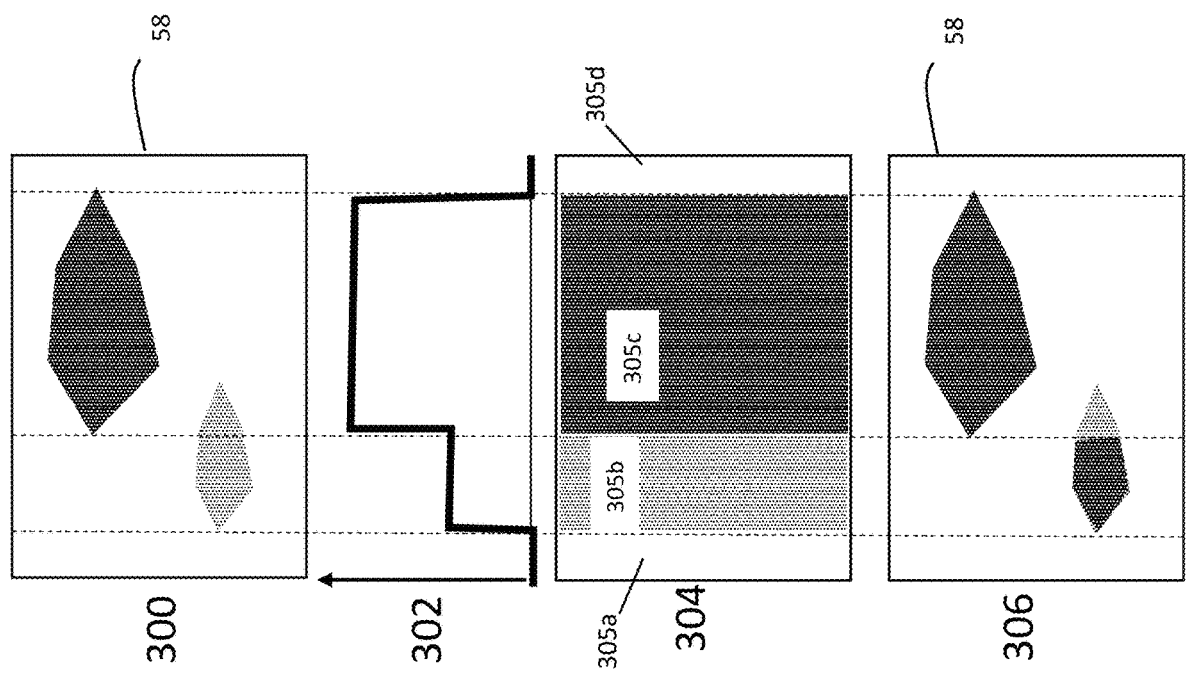
FIG. 13 is a schematic representation of a reduced-intensity illumination scheme employing variable intensity illumination.

Image 300 in FIG. 13 shows a simple pattern (for illustrative purposes) having variable image intensity over the image plane pixel array 58. The darker image here portrays higher intensity. This image is for a single color and three such images generate every frame for all colors. The dashed lines are for ease of reference to features between the different representations of the Figure.

If the LCOS is to be scanned with a beam at constant maximum intensity, this image as illustrated in pattern 300 would be loaded as is, and scanning with the maximum intensity beam would generate the desired output image. As an alternative, according to this aspect of the present invention, graph 302 illustrates a "maximum required intensity" for each column of image 300. This pattern is then used to set a corresponding profile of laser intensity as the illuminating line (60 for example) scans lately across the LCOS consequently minimal attenuation is requited from the LCOS 26. Image 304 show the resulting illumination intensity across the LCOS. At beginning of scan (covering area 305a of the array) there is no laser illumination. For area 305b, an intermediate intensity is used, corresponding to a "reduced illumination level". Area 305c is illuminated with maximal intensity and at the final section (area 305d) requires no illumination.

Image 306 corresponds to a modified pixel intensity map such that the product of the modified pixel intensity of 306 and the illumination level for a given column from 304 will generate the desired output image intensity 300. Thus, the image 306 (the actual image loaded to the LCOS) is generated by dividing the required image 300 by the illumination image 304.

In practice, the illumination line has some width (i.e., covers a number of columns simultaneously) and as a result illumination image 304 will be smooth with gradual transitions, even if the illumination output is driven by a step function, as the overall intensity of illumination for each column will be the integral of the illumination as the illumination line passes. The calculation of the loaded image 306 as the desired output image 300 divided by the illumination level 304 remains valid.

Although the reduced illumination level has been described thus far as being achieved by a reduction in intensity of the illumination source, an equivalent effect can be achieved by modulating a rate of motion of the scanning motion, where a standard scanning rate results in the full intensity illumination, and an increased scanning rate of motion results in a reduced scanning dwell time in the corresponding regions, giving the "reduced illumination level". In certain cases, an enhanced brightness (in excess of the normal 100% intensity level) may be provided by employing a slower scanning motion, or repeat scanning of a sub-area of the array.

Figure 14:
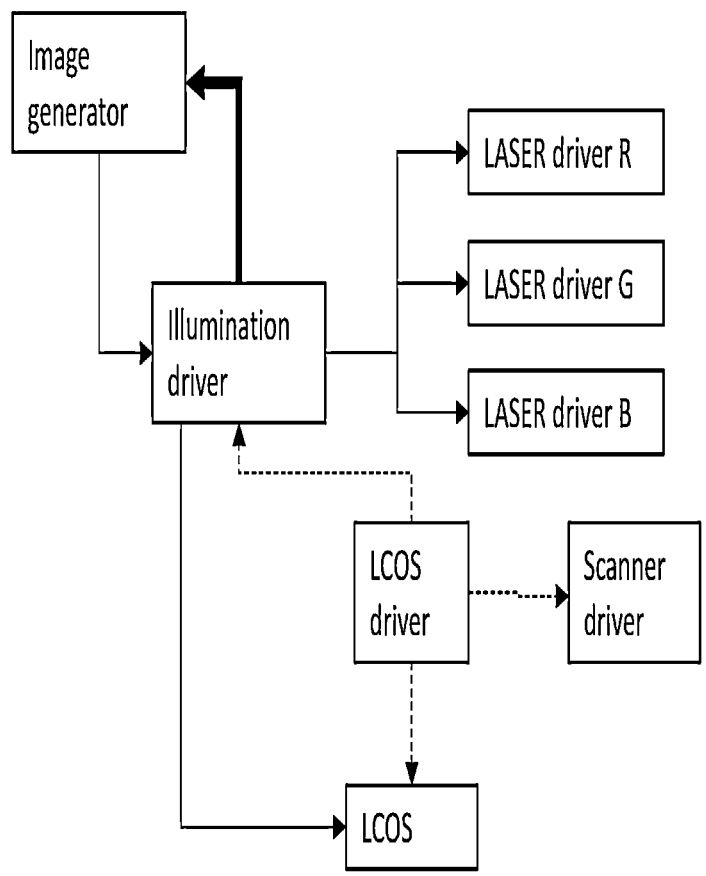
FIG. 14 is a schematic representation of a controller for operating the image projectors of FIGS. 9A-13.

FIG. 14 presents schematically a control system suitable for implementing the various embodiments of FIGS. 9A-13, and particularly those which require synchronous operation of the updating of an LCOS SLM with illumination and/or scanning motions. In this figure, solid lines represent data transmission and dashed lines represent synchronization. The "image generator" transmits the RGB data matrices of the image to "illumination driver". This driver generates the illumination pattern required from the lasers assuming illumination pattern (line or other) and image pattern. This derivation process preferably optimizes the laser to transmit minimal power at every position (line) as described above, typically requiring corresponding modification of the image data to be loaded to the LCOS. The dark arrow represents the feedback from the illumination driver to the image generator for these modification. It is possible to introduce some of the functionalities of the 'illumination driver' in the image generator itself. The final RGB images are injected to the LCOS. The LCOS driver generates the synchronization signal to the LCOS, the scanner driver and the illumination driver.

The depiction of FIG. 14 is a minimal depiction for certain of the above applications. It should be noted that the various drivers depicted may be implemented in a range of ways including, but not limited to, dedicated control circuitry for each component, software drivers as part of a software package operating on a processing system with one or more processors, or any other combination of hardware, software or firmware, typically with additional communication or other input interfaces, and data storage devices. All of the various drivers, control circuitry and accompanying components are referred to herein collectively as a "controller".

Figure 15A:
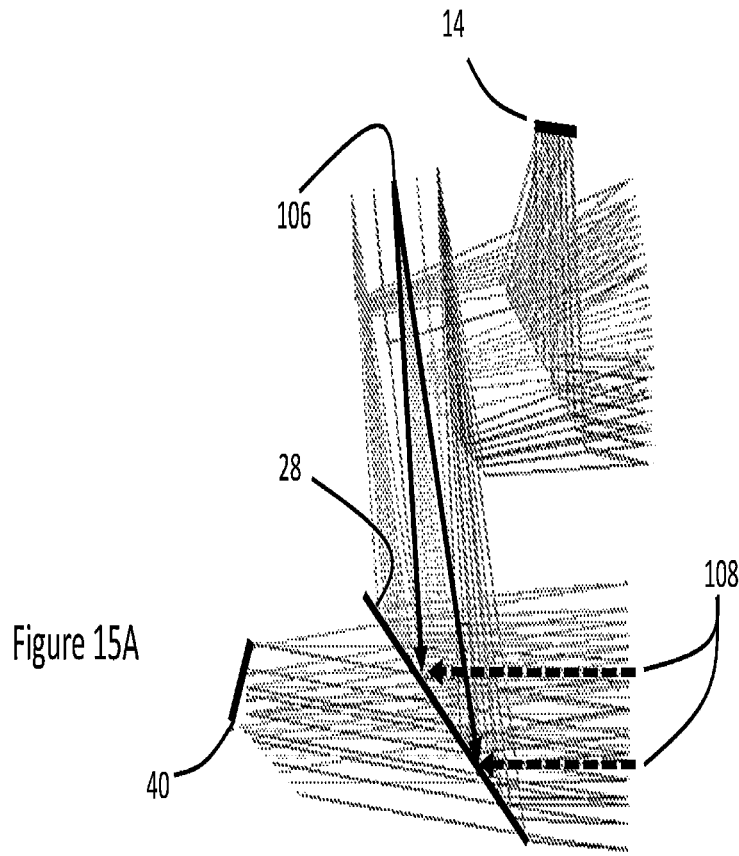
FIG. 15A is a ray diagram illustrating the geometry of incident rays to a polarized beam splitter (PBS) from the image projector of FIG. 2A.
Figure 15B:
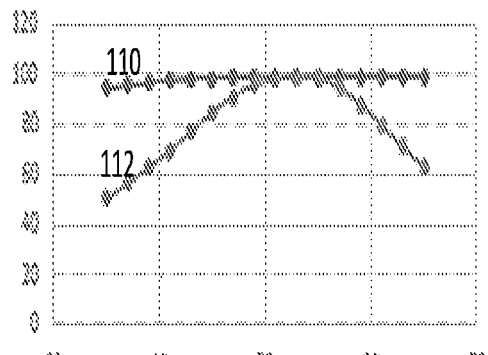
FIG. 15B is a graph illustrating transmission and reflection properties for a dielectric PBS from FIG. 15A.

Turning now to FIGS. 15A and 15B, the transmission of polarization sensitive dielectric coatings varies with angle. This can degrade image quality. FIG. 15A shows the optical pass of the system from FIG. 2A including the dielectric coating 28. Arrows 106 show the diverging light-rays emerging from a single pixel as they impinge on dielectric surface 28 at different angles as light-rays from other pixels impinge on 28 at same angular distribution. This spectrum of impinging angles may result in different reflections of the different angles and therefore non-uniform illumination of the exit aperture 40. This non-uniformity will degrade image quality and be disturbing to the observer of a near eye display system. Therefore, according to certain implementations of the present invention, the reflectivity of the S polarization is preferably designed to be optimal as shown in 110, as a design consideration which takes priority over uniformity of P-polarization transmission.

The reflected light 108 of the single pixel 106 impinge on 28 as parallel rays having same angle of incidence. However, the light-rays from different pixels will have different angle of incidence. Consequently, different pixels (image field points) will have different transmission through 28 as shown in 108 in FIG. 15B. According to certain preferred implementations of the present invention, the optimal transmission is designed for the center of field, or can be shifted to compensate for other system non-uniformities (such as for tilted aperture 40). This apodization of image at edges is typically more acceptable to the observer, and can be compensated by proper illumination of illumination input surface 14.

Figure 16A:
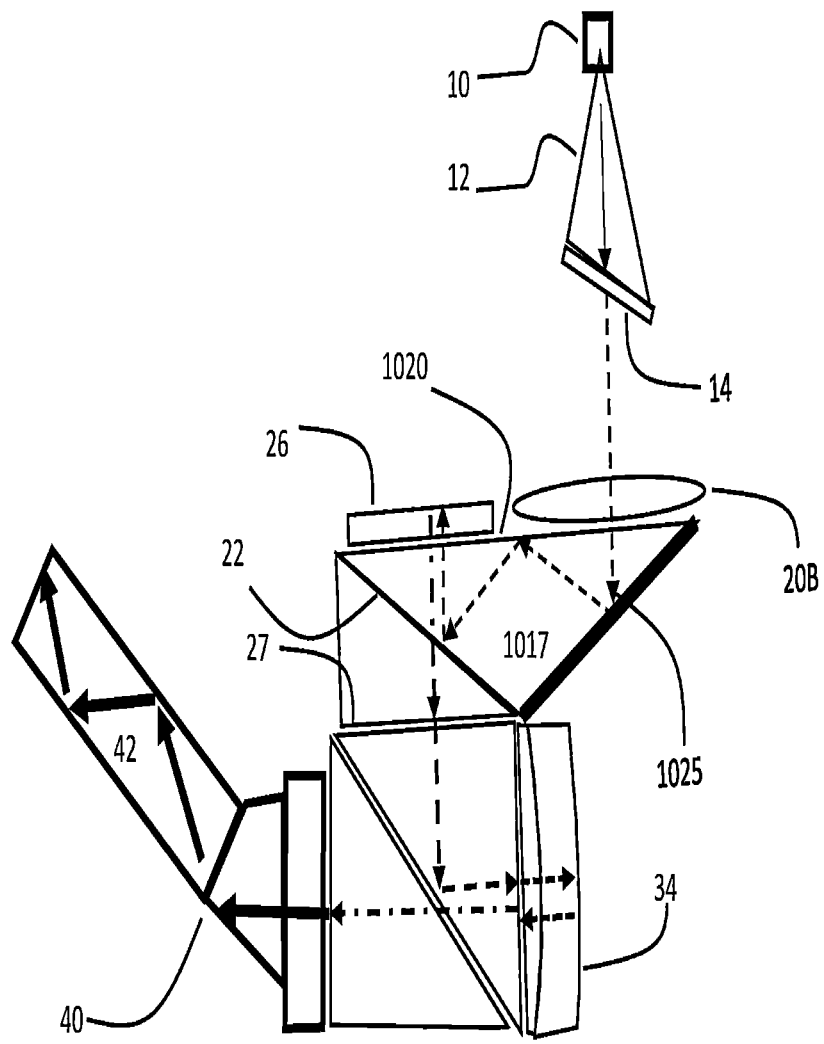
FIGS. 16A and 16B are side views of an image projector illustrating two alternative implementations according to the teachings of an embodiment of the present invention, employing shallow-angle beam splitters to shorten optical path lengths.
Figure 16B:
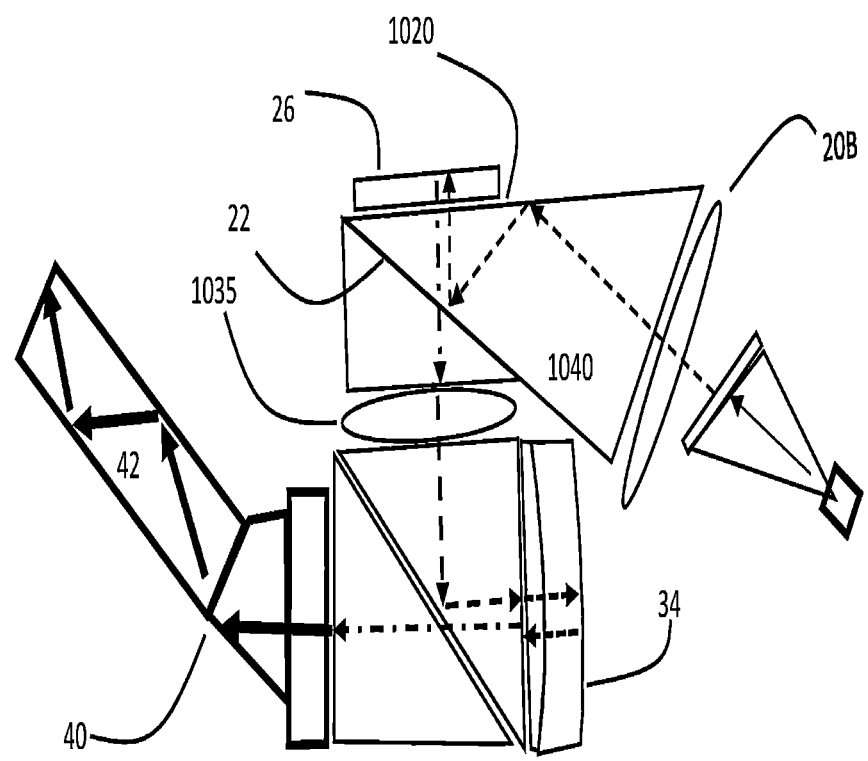

Turning now to FIGS. 16A and 16B, in an alternative architecture according to an aspect of the present invention, when spatial light modulator 26 is a reflective spatial light modulator, illumination is directed towards SLM 26 by internal reflection at a surface parallel to a plane of the SLM 26 followed by reflection at a beam splitter plane oriented at an angle of substantially 30 degrees to the plane of the spatial light modulator. Substantially 30 degrees in this context refers to an angle of 30 degrees ±5 degrees, and more preferably ±3 degrees.

Thus, FIG. 16A shows an exemplary architecture according to which the optical path of PBS 22 is shortened. In this configuration the light from source 10 passes through expanding light-pipe 12 onto plane 14. In this figure the plane is tilted since it is an image of tilted aperture 40. This tilting or flat orientation of plane 14 can be implemented in all previous architectures. Plane 14 can also include a polarizer that transmit the s-polarization.

The light passes through lens 20B (equivalent to illumination optics 2) and enters prism 1017. Face 1025 is coated with a reflective coating so the light reflects onto face 1020 where it is reflected by Total Internal Reflection (TIR) onto PBS 22 and to image modulator 26. As mentioned, in this configuration PBS plane is at angle approximating 30 degrees that is shallow relative to previous architectures. Consequently, the height of PBS 22 is shorter and the size of the system is reduced. In this configuration, face 1020 must be clean and have an air-gap, or be coated with an angularly selective coating. The retarder 27 can be eliminated by rotating PBSs as described in FIG. 4.

In FIG. 16B the prism 1017 was replaced by prism 1040. This prism does not need reflecting coating 1025. All other optical properties are preserved.

In FIG. 16B the reduced height of PBS 22 enables introduction of lens 1035 that improves the optical performance of the system.

Figure 17:
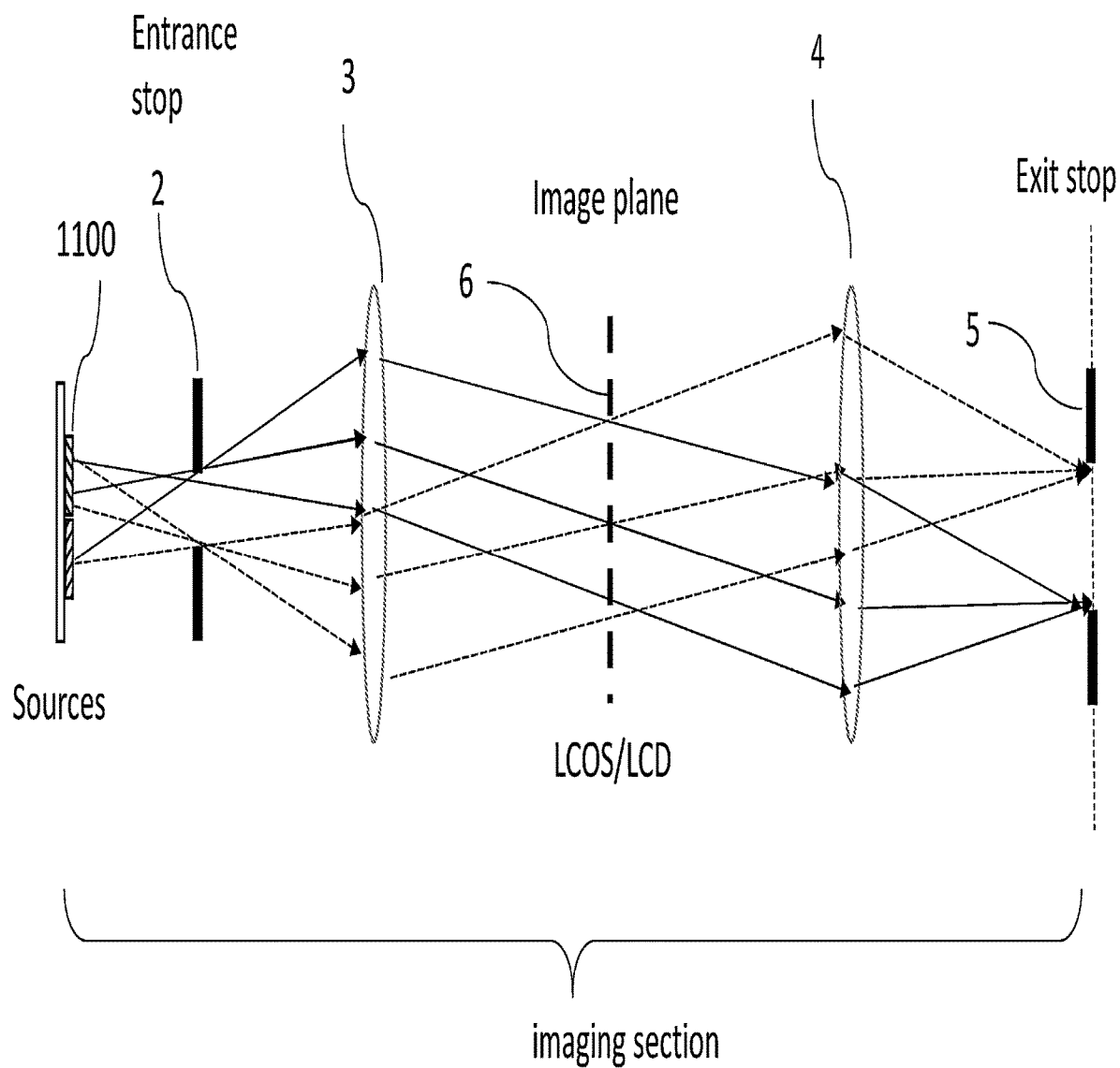
FIG. 17 is a schematic representation of an image projector similar to FIG. 1, but employing selective illumination via a plurality of switchable illumination elements.

As an alternative to mechanical scanning of an illumination source, certain implementations of the present invention provide an illumination arrangement with a plurality of independently switchable illumination sources for illuminating the plurality of regions. Such an arrangement is illustrated schematically in FIG. 17. In this configuration, Stop 5 is imaged onto stop 2 as previously described, and image plane 6 of the optical modulator is preferably substantially imaged to plane 1100 by lens 3. Plane 1100 includes distributed light sources that can be activated individually. In this configuration, every light source illuminates a corresponding section of image generator 6. The algorithm of activation of the individual sources is essentially equivalent to that described in relation to the scanning illumination embodiments described above. Consequently, less power is transmitted and no moving parts are required.

Preferably plane 1100 is slightly diffuse when imaging to 6 in order to eliminate non-uniformities. This can be achieved by a small angle diffuser or by slight defocusing as shown in FIG. 18.

Figure 18:
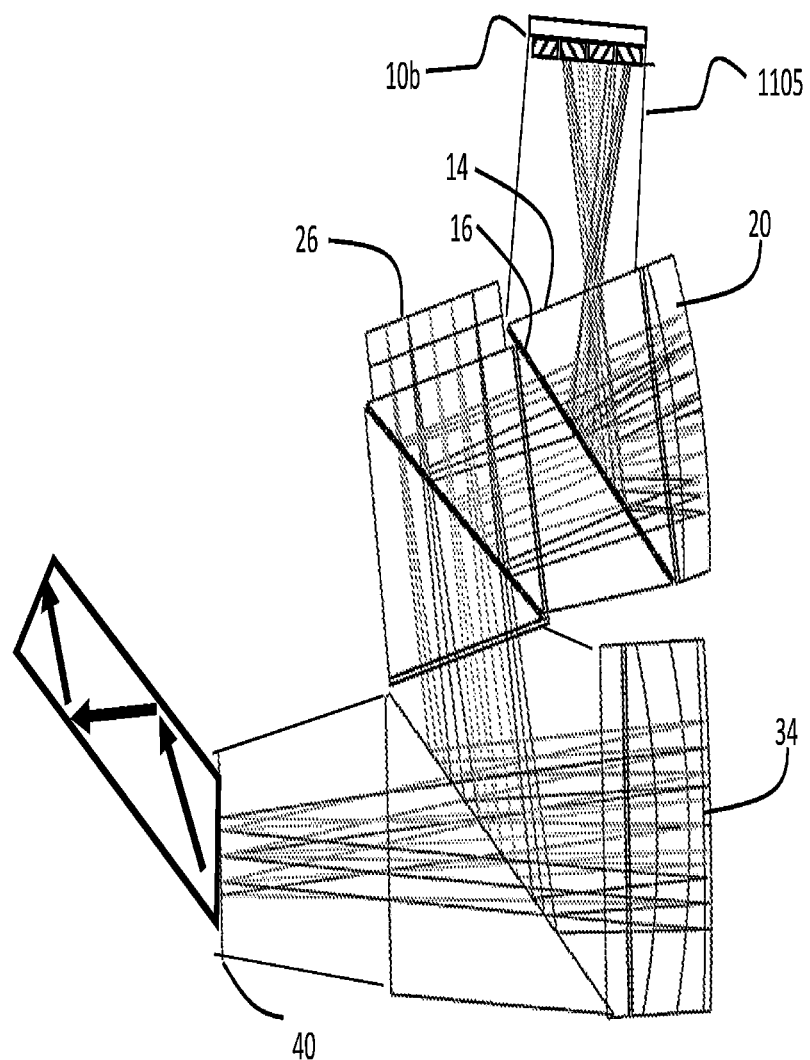
FIG. 18 is a side view of an implementation of an image projector generally similar to FIG. 9A, but employing switchable illumination elements rather than mechanical scanning.

FIG. 18 shows an architecture equivalent to FIG. 2A (stop plane 40 is imaged to 14). However, in this case, image plane 26 (equivalent to 6) is imaged to sources plane 10b (equivalent to 1100). Lens 20 (equivalent to 3) is modified to focus plane 26 to 10b with some offset for non-uniformity smoothing. The light propagates within prism 1105, allowing the system to be implemented without an air-gap.

The imaging of 26 onto 10b can be achieved also using another reflecting lens. A conventional lens or a micro-lens-array can be used to improve light collection from sources array.

The light sources can be white LEDs with spatial light modulator 26 having a color filter. Alternatively, color sources can be interlaced (for example Bayer format) and the defocusing (or slight defusing) smears the illumination so every pixel on 26 is illuminated by all colors.

Figure 19A:
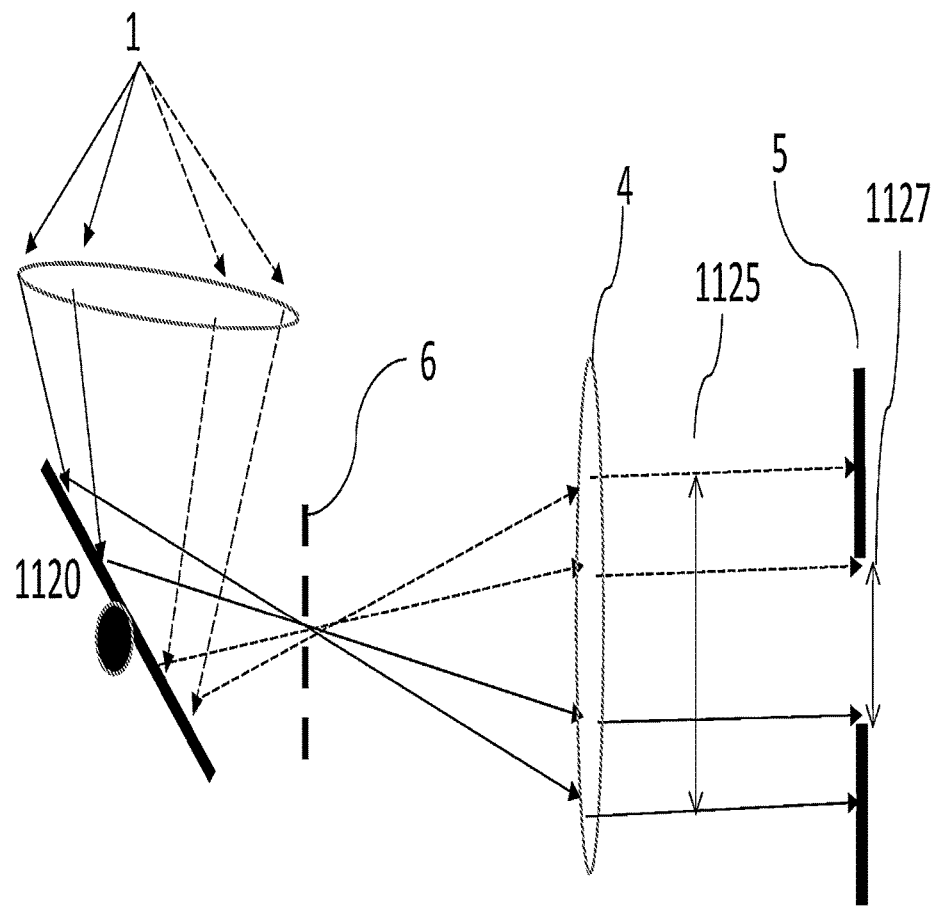
FIGS. 19A and 19B are schematic side views of an image projector employing scanned illumination on a spatial light modulator but with an energetically sub-optimal illumination arrangement.
Figure 19B:
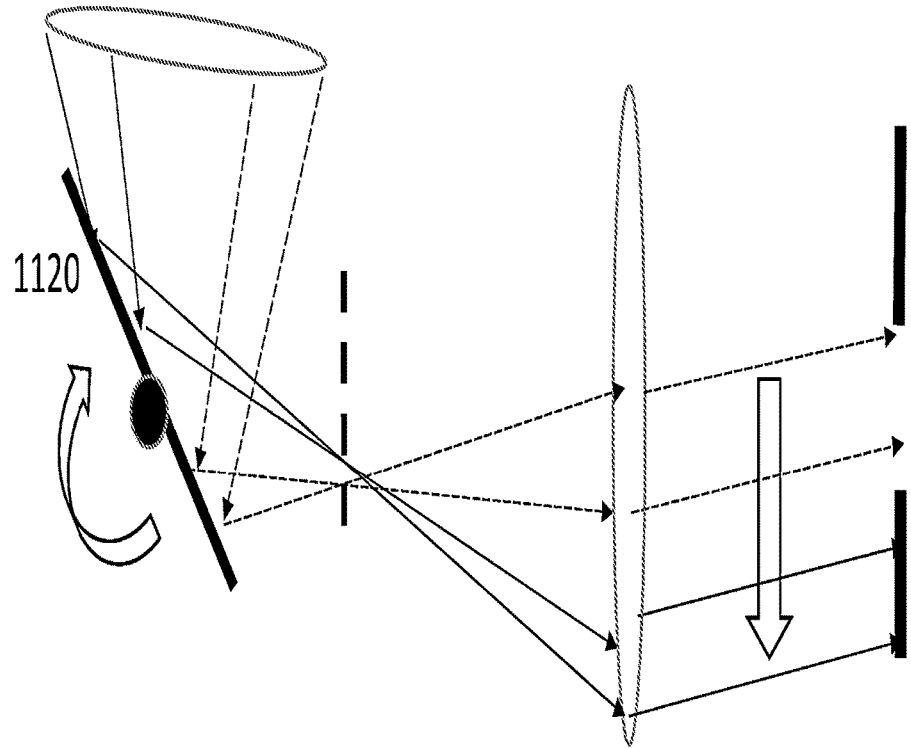

FIGS. 19A and 19B show an architecture in which illumination of the image modulator is partial and scanned, but without the "pupil-imaging" between an illumination stop and the exit stop. In this configuration, the illumination width 1125 must be wider than the width 1127 of the required stop 5. FIG. 19A shows schematically an architecture where scanning mirror 1120 is centered to illuminate the center of SLM 6. The light from source 1 is focused on center of 6.

As the mirror 1120 is twisted to illuminate the lower section of SLM 6 (as shown in FIG. 19B) the illumination spot on 5 is shifted. Therefore the wider illumination 1125 enables effective illumination of the entire aperture of exit stop 5 at all modulator illuminations alternatives, but at the cost of higher illumination loss at the stop.

Figure 20:
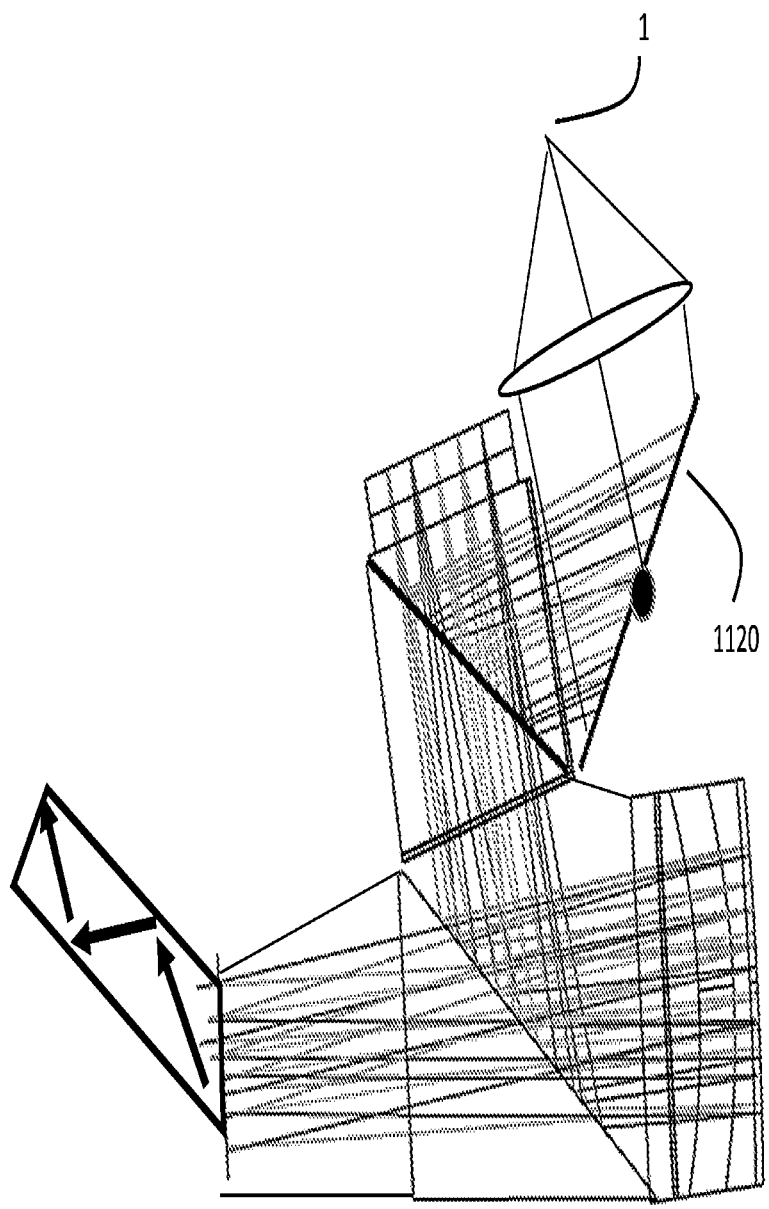
FIG. 20 is a side view of an implementation of the system of FIGS. 19A-19B employing reflective collimating optics.

A schematic illustration of an implementation based on these principles is depicted in FIG. 20, where the remaining structure is essentially similar to that of FIG. 2A from the PBS 22 and onwards along the optical path.

Figure 21:
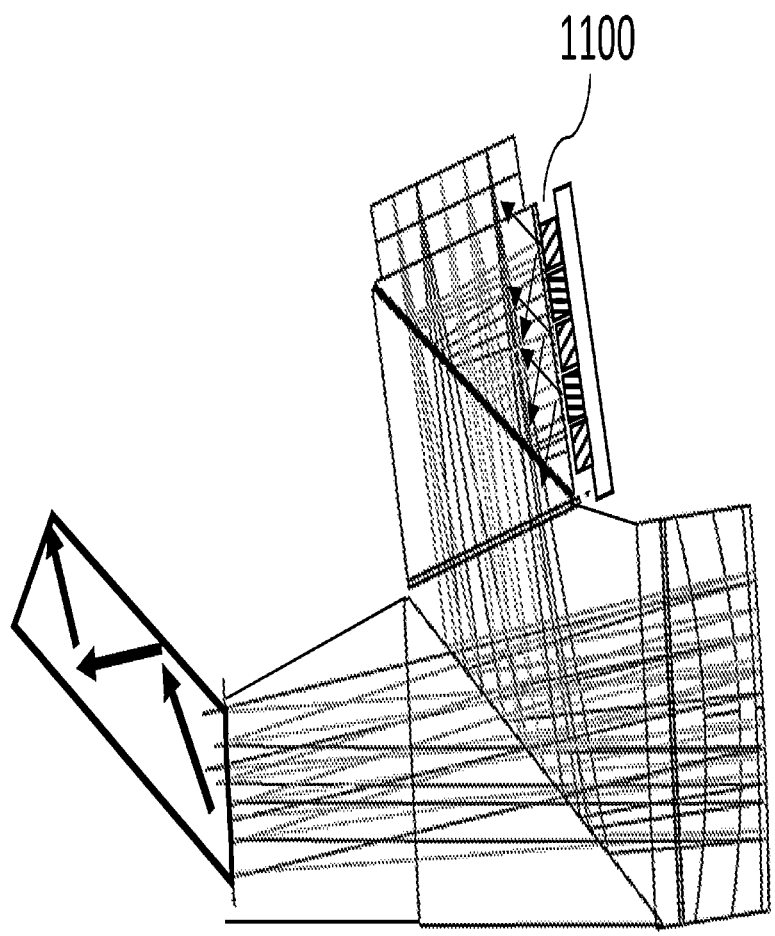
FIG. 21 is a side view of an image projector similar to FIG. 20 but employing switchable optical source elements.

FIG. 21 shows an alternative architecture using an array of sources 1100 that are not positioned at a pupil-image or focal plane. In this arrangement only the 'valid' rays (shown) will eventually couple into the waveguide, while 'invalid' rays (shown as arrows) will not. This is a simple arrangement, but also associated with high power loss.

Figure 22:
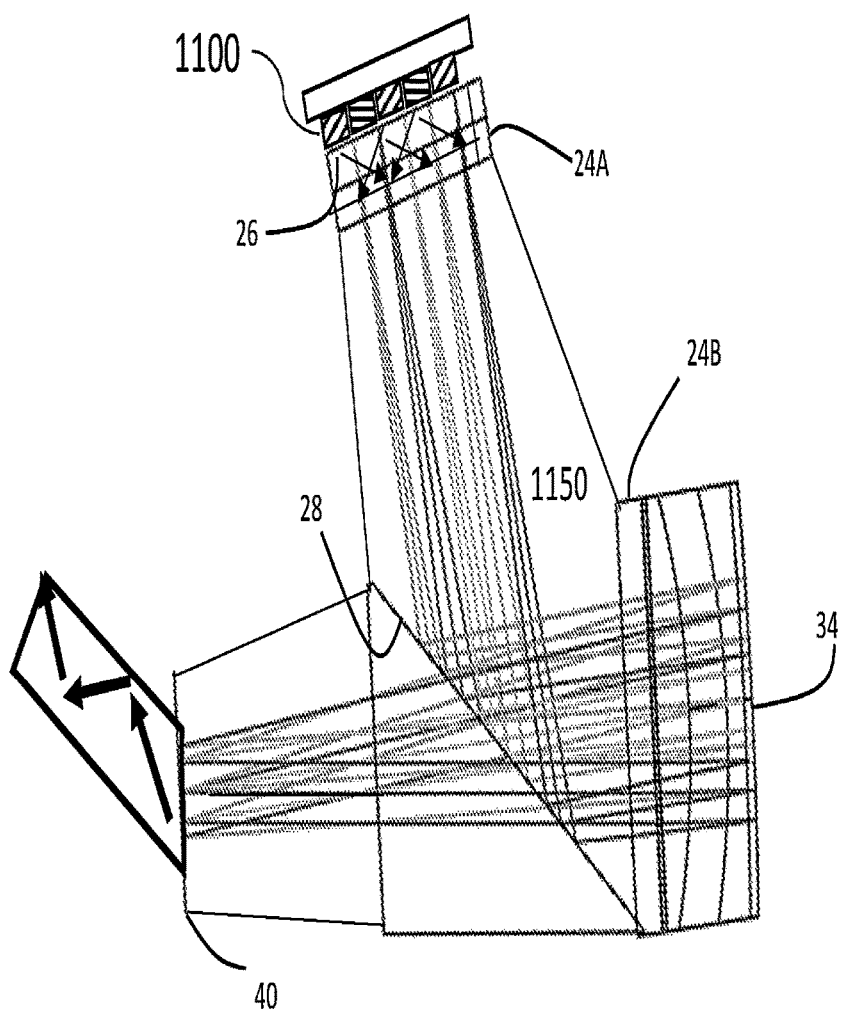
FIG. 22 is a side view of an image projector similar to FIG. 21 but employing a transmissive spatial light modulator with switchable optical source elements.

FIG. 22 shows a further simplified arrangement where image modulator 26 is a transparent spatial light modulator, most preferably an LCD, having distributed light sources 1100 (with a polarizer) attached to it. This arrangement requires only one PBS 28. The direct attachment of the modulator to the optical prism 1150 enables improved heat dissipation (which is typically a significant design challenge with transparent LCD implementations) while focus is managed by spacers 24A and/or 24B. A single illuminator can replace the distributed illuminator 1100 for a particularly simple implementation, but with increased power loss.

Figure 23A:
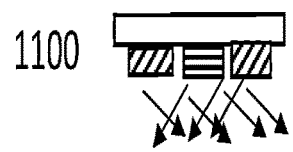
FIGS. 23A and 23B illustrate two configurations for providing switchable optical source elements.
Figure 23B:
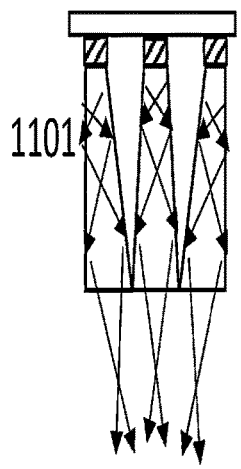

FIGS. 23A-23B present alternative configurations for combining an array of emitters. A matrix of emitters (LEDs or OLED) 1100 will transmit light in a wide angular distribution, typically resulting in higher illumination loss. In all previous configurations, an alternative illumination architecture 1101 can be used. This configuration includes a condenser for every emitter. The emitter typically includes one white source or a plurality of individual color sources (for example, R, G, B LEDs). Preferably all sourced are placed on one PCB for integration simplicity. Preferably the condensers are tilted (as shown) as required by the optical arrangement of the projector. For example, illumination architecture 1101 is in this case optimized for illumination source 10b in FIG. 18, above.

There are various ways to generate scanning of illumination on the image modulator. As an alternative to a scanning mirror arrangement discussed above, a scanning light-beam can be generated by flexing a tip of an illuminating optical fiber. Various arrangements can be used to cause deflection of a flexible optical fiber tip in order to generate the required scanning of an illumination pattern across regions of the spatial light modulator. FIG. 24 presents schematically only one alternative that is considered particularly advantageous in terms of illumination energy by preserving pupil-imaging.

Figure 24A:
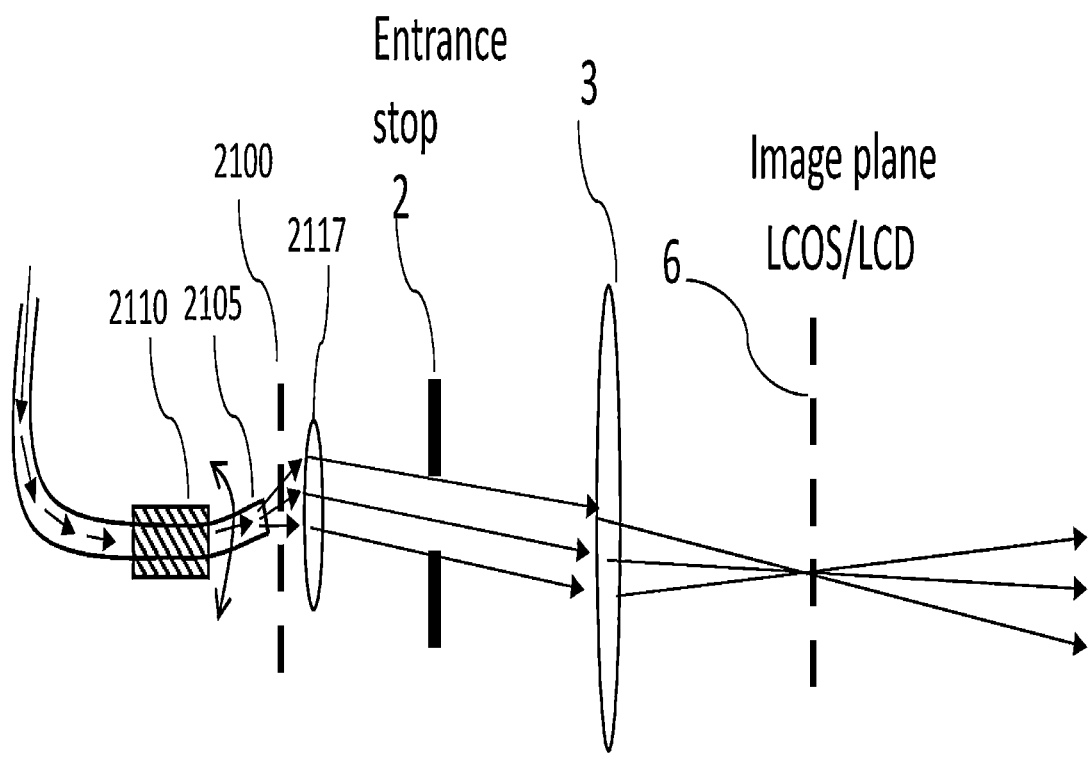
FIG. 24A is a schematic side view of an illumination scanning arrangement based on displacement of a tip of an optical fiber.
Figure 24B:
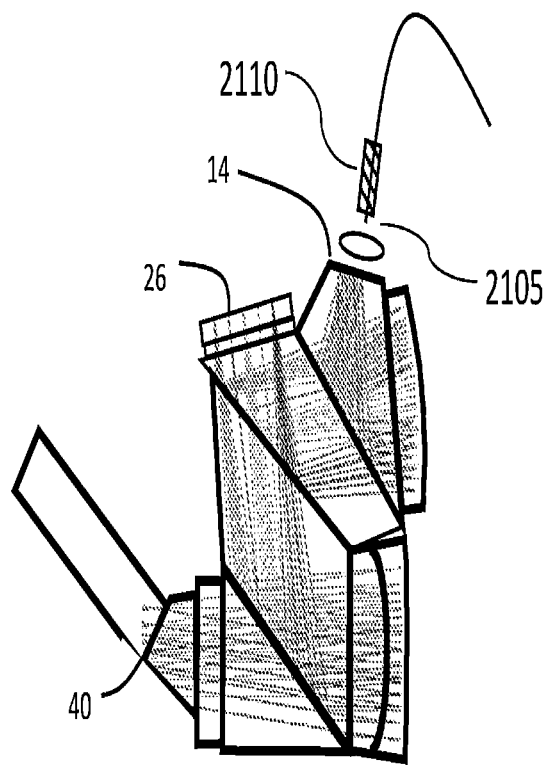
FIG. 24B is a side view of an image projector generally similar to FIG. 9A but employing the fiber-based scanning mechanism of FIG. 24A.

In FIG. 24A, the plane 2100 (equivalent to the location 1100 in FIG. 17) is the image of plane 6. The tip of the fiber 2105 is located in, and moves within, this plane. The motion is generated by device 2110, which may be a piezo-electric actuator, although other electro-mechanical actuators may also be used. The angular width of the light emerging from the fiber is set to fill aperture 2 after lens 2117, thereby illuminating all the entrance to the waveguide 5. The lens 3 focuses the illumination into a spot on imager plane 6. The spot is large to cover a plurality of pixels, and typically a substantial section of the imager, all as previously described. A non-limiting example for an optical implementation having minimal air-gap and based on the displaceable fiber tip approach is illustrated in FIG. 24B. The only air gap is near the fiber tip, which can advantageously be encapsulated as a closed component in combination with the adjacent lens 2117, thereby facilitating an implementation without any inter-component air gaps, as defined earlier.

It will be appreciated that the above descriptions are intended only to serve as examples, and that many other embodiments are possible within the scope of the present invention as defined in the appended claims.

What is claimed is:

1. An image projector for projecting a collimated image via an exit stop, said collimated image being a representation of a digital image, the image projector comprising:
   (a) a spatial light modulator providing a two dimensional array of pixel elements, each of said pixel elements being controllable to modulate a property of light transmitted or reflected by said pixel element;
   (b) an illumination arrangement delivering illumination to said spatial light modulator;
   (c) a controller in electronic connection with said spatial light modulator and said illumination arrangement; and
   (d) a collimating arrangement of at least one optical element configured to collimate illumination from said spatial light modulator to generate a collimated image directed to said exit stop,
wherein said illumination arrangement is configured to sequentially illuminate a plurality of regions of said spatial light modulator, each region containing a plurality of said pixel elements, and wherein said controller is configured to synchronously control said pixel elements and vary an illumination level of said illumination arrangement so as to illuminate the plurality of regions of said spatial light modulator with differing levels of illumination and to control said pixel elements according to the differing levels of illumination so as to project a collimated image with pixel intensities corresponding to the digital image.

2. The image projector of claim 1, wherein said illumination arrangement includes a scanning arrangement deployed to scan a beam of illumination across said two-dimensional array of said spatial light modulator.

3. The image projector of claim 2, wherein said beam of illumination spans one dimension of said two-dimension array, and wherein said scanning arrangement scans said beam of illumination in a one-dimensional scanning pattern.

4. The image projector of claim 2, wherein said controller updates pixel elements of said two-dimensional array in a sequence of rows sweeping across said two-dimensional array, and wherein said scanning arrangement is synchronized to follow behind said sequence of rows, illuminating part of an updated image before completion of said update across said two-dimensional array.

5. The image projector of claim 4, wherein said illumination arrangement is configured to generate at least two simultaneous beams of at least two different colors in different angular positions, and wherein said controller updates pixel elements of said two-dimensional array between passing of a first of said beams and a second of said beams.

6. The image projector of claim 2, wherein said scanning arrangement scans said beam of illumination in a two-dimensional scanning pattern.

7. The image projector of claim 2, wherein said scanning arrangement includes a tip of an optic fiber and an actuator deployed for displacing said tip of said optic fiber.

8. The image projector of claim 1, wherein said illumination arrangement includes a plurality of independently switchable illumination sources for illuminating said plurality of regions.

9. The image projector of claim 1, wherein said controller is configured to:
   (a) determine a maximum required intensity of a pixel of the digital image in a part of the digital image corresponding to each of said regions of the two-dimensional array;
   (b) determine a reduced illumination level for at least one of said regions sufficient to generate the corresponding maximum required intensity within said regions;
   (c) generate a modified pixel intensity map for pixels within said at least one region for generating a required projected image intensity based on said reduced illumination level; and
   (d) actuate said illumination arrangement to illuminate at least one region with said reduced illumination level while said pixel elements within said at least one region are actuated according to said modified pixel intensity map.

10. The image projector of claim 1, wherein said illumination arrangement delivers said illumination from an illumination stop, the image projector further comprising illumination optics deployed in an optical path between said illumination stop and said spatial light modulator, wherein said illumination optics and said collimating arrangement are configured such that an image of said illumination stop falls substantially on the exit stop.

11. The image projector of claim 10, wherein said illumination optics and said collimating arrangement are implemented using reflective optical components, and wherein an optical path from said illumination optics to said exit stop is implemented without an air gap.

12. The image projector of claim 10, further comprising a diffuser deployed at said illumination stop.

13. The image projector of claim 12, wherein said diffuser has a substantially linear intensity distribution.

14. The image projector of claim 12, wherein said diffuser has a rectangular intensity distribution.

15. The image projector of claim 10, further comprising a scanning arrangement deployed to generate a beam of illumination scanning a range of angles at said illumination stop.

16. The image projector of claim 10, wherein said spatial light modulator is a reflective spatial light modulator, and wherein illumination is directed towards said spatial light modulator by internal reflection at a surface parallel to a plane of said spatial light modulator followed by reflection at a beam splitter oriented at an angle of substantially 30 degrees to said plane of said spatial light modulator.

17. The image projector of claim 10, further comprising a light guide formed as a block of transparent material having at least one pair of parallel faces for supporting propagation of a projected image by internal reflection, wherein the exit stop is an entrance to said light guide.

18. The image projector of claim 1, wherein said controller updates pixel elements of said plurality of regions of said two-dimensional array synchronously with the sequential illumination of said plurality of regions such that pixel values in at least one of said plurality of regions are updated during a period of illumination of another of said plurality of regions.

19. The image projector of claim 1, wherein said controller updates pixel elements of said plurality of regions of said two-dimensional array synchronously with the sequential illumination of said plurality of regions such that pixel values in a first of said plurality of regions are updated during a period of illumination of a second of said plurality of regions with a first color and of a third of said plurality of regions with a second color.

20. The image projector of claim 1, wherein said illumination arrangement is configured to generate at least two simultaneous beams of at least two different colors in different angular positions, said at least two simultaneous beams being generated by a side-by-side arrangement of laser light sources of different colors.

\* \* \* \* \*